(12) United States Patent
Malcolm

(10) Patent No.: US 10,800,690 B2
(45) Date of Patent: Oct. 13, 2020

(54) PORTABLE LIQUID RECOVERY SYSTEM WITH OPTIONAL PRELIMINARY PROCESSOR AND FEED

(71) Applicant: Wilmac, Inc., Rancho Santa Margarita, CA (US)

(72) Inventor: William Carlyle Malcolm, San Juan Capistrano, CA (US)

(73) Assignee: Wilmac, Inc., Rancho Santa Margarita, CA (US)

( * ) Notice: Subject to any disclaimer, the term of this patent is extended or adjusted under 35 U.S.C. 154(b) by 277 days.

(21) Appl. No.: 15/715,158

(22) Filed: Sep. 26, 2017

(65) Prior Publication Data

US 2018/0086655 A1 Mar. 29, 2018

Related U.S. Application Data

(60) Provisional application No. 62/530,838, filed on Jul. 10, 2017, provisional application No. 62/401,068, (Continued)

(51) Int. Cl.
*C02F 9/00* (2006.01)
*B01F 7/06* (2006.01)
(Continued)

(52) U.S. Cl.
CPC ............ *C02F 9/00* (2013.01); *B01D 21/2405* (2013.01); *B01D 21/283* (2013.01); *B01F 3/1221* (2013.01); *B01F 7/00341* (2013.01); *B01F 7/00633* (2013.01); *B01F 7/06* (2013.01); *B01F 7/063* (2013.01); *B01F 13/1016* (2013.01);
(Continued)

(58) Field of Classification Search
CPC ........................................................ C02F 9/00
See application file for complete search history.

(56) References Cited

U.S. PATENT DOCUMENTS 2,766,629 A * 10/1956 Booth ..................... B06B 1/166
                                                                74/61
4,482,459 A    11/1984 Shiver
               (Continued)

FOREIGN PATENT DOCUMENTS

CN        1458076 A     11/2003
CN      102226381 A     10/2011
              (Continued)

*Primary Examiner* — Peter Keyworth
(74) *Attorney, Agent, or Firm* — Zeman-Mullen & Ford, LLP

(57) ABSTRACT

A system and process for removing solids from raw, untreated liquid that combines mechanical techniques, such as via shakers, hydrocyclones author centrifuges, with an additive technique for removal of smaller solids. The additive is selected according to the application. In drilling mud applications, preferred additive embodiments are polyaluminum chloride or polyacrylamide flocculants. Preferably, liquid additive precursors are pre-mixed separately and are then blended before injection into the solids removal process. Some embodiments provide an externally-actuated rack and pinion mud screen lock for simplified screen lockdown on shakers. Some embodiments provide a separate preliminary processing and feed system for pretreatment of the raw, untreated liquid.

3 Claims, 13 Drawing Sheets

Related U.S. Application Data filed on Sep. 28, 2016, provisional application No. 62/400,032, filed on Sep. 26, 2016.

(51) Int. Cl.

| | | |
|---|---|---|
| *B01D 21/24* | (2006.01) | |
| *B01D 21/28* | (2006.01) | |
| *B01F 3/12* | (2006.01) | |
| *B01F 7/00* | (2006.01) | |
| *B01F 13/10* | (2006.01) | |
| *C02F 1/38* | (2006.01) | |
| *C02F 11/121* | (2019.01) | |
| *B01D 21/01* | (2006.01) | |
| *B01D 21/26* | (2006.01) | |
| *C02F 1/34* | (2006.01) | |
| *C02F 1/52* | (2006.01) | |
| *C02F 1/56* | (2006.01) | |
| *C02F 103/10* | (2006.01) | |

(52) U.S. Cl.
CPC ............ *B01D 21/01* (2013.01); *B01D 21/262* (2013.01); *B01D 21/267* (2013.01); *B01F 2215/0052* (2013.01); *C02F 1/34* (2013.01); *C02F 1/38* (2013.01); *C02F 1/385* (2013.01); *C02F 1/5236* (2013.01); *C02F 1/56* (2013.01); *C02F 11/121* (2013.01); *C02F 2103/10* (2013.01); *C02F 2303/24* (2013.01)

(56) References Cited

U.S. PATENT DOCUMENTS

| | | | |
|---|---|---|---|
| 4,810,386 A | | 3/1989 | Copa et al. |
| 5,338,459 A | | 8/1994 | Hirose |
| 6,652,757 B2 | | 11/2003 | Hodges et al. |
| 8,827,080 B2 * | | 9/2014 | Holton ...................... B07B 1/46 |
| | | | 209/395 |
| 9,289,805 B2 | | 3/2016 | Bagnoli |
| 9,561,452 B2 | | 2/2017 | Zeidler |
| 2004/0069536 A1 * | | 4/2004 | Cowan .................. E21B 21/066 |
| | | | 175/66 |
| 2004/0182258 A1 * | | 9/2004 | Ehling ..................... A24B 3/18 |
| | | | 99/467 |
| 2006/0225925 A1 | | 10/2006 | Ivan et al. |
| 2012/0305468 A1 * | | 12/2012 | Sato ..................... B01D 21/286 |
| | | | 210/295 |
| 2013/0062287 A1 | | 3/2013 | Hodges et al. |
| 2015/0053623 A1 * | | 2/2015 | Holt ......................... C02F 1/56 |
| | | | 210/734 |
| 2018/0080295 A1 * | | 3/2018 | Newman ............... E21B 21/066 |

FOREIGN PATENT DOCUMENTS

| | | |
|---|---|---|
| CN | 102320699 A | 1/2012 |
| CN | 202688158 U | 1/2013 |
| CN | 103104203 A | 5/2013 |
| CN | 103626344 B | 6/2015 |
| CN | 104710088 A | 6/2015 |
| CN | 104747107 A | 7/2015 |
| CN | 104912503 A | 9/2015 |
| CN | 103061697 B | 12/2015 |
| CN | 104265214 B | 2/2017 |
| CN | 105443053 B | 10/2017 |
| CN | 106014306 B | 12/2018 |
| JP | 2-90911 A | 3/1990 |
| JP | 2717147 | 11/1997 |
| JP | 3146280 B2 | 1/2001 |
| JP | 2007-222835 A | 9/2007 |
| KR | 10-0964711 | 6/2010 |
| KR | 10-1365734 | 2/2014 |
| WO | 2015081878 A1 | 6/2015 |
| WO | 2017027930 A1 | 2/2017 |

\* cited by examiner

PORTABLE LIQUID RECOVERY SYSTEM WITH OPTIONAL PRELIMINARY PROCESSOR AND FEED

RELATED APPLICATIONS

This application claims the benefit of, and priority to, the following three commonly-invented and commonly-assigned U.S. Provisional Patent Applications: (1) Ser. No. 62/400,032 filed Sep. 26, 2016; (2) Ser. No. 62/401,068 filed Sep. 28, 2016; and (3) Ser. No. 62/530,838 filed Jul. 10, 2017. The disclosures of 62/400,032, 62/401,068 and 62/530,838 are incorporated herein in their entirety.

FIELD OF THE DISCLOSURE

This disclosure is directed generally to technology useful for removal of solids suspended in liquids such as, for example and without limitation, sewage water or drilling mud (although other exemplary applications are itemized further on in this disclosure).

BACKGROUND OF THE DISCLOSED TECHNOLOGY

The solids removal technology described in this disclosure is useful to clean many liquids, and thus the technology has many applications. However, the example of solids removal from subterranean drilling mud is used in this "Background" section to illustrate just one problem in the art that the disclosed solids removal technology addresses.

Drilling mud is well understood in subterranean drilling to provide numerous advantages in drilling operations. Although termed "mud", drilling mud is invariably an engineered liquid designed to have specific properties that enable its advantages when used in drilling operations. The precise "mud" selected for a particular drilling operation will depend on desired performance characteristics specific to the operation. The mud is pumped downhole and circulated through the borehole during drilling, providing (just for example): (1) pressure and flow to actuate positive displacement drilling motors above the bit; (2) removal of drill bit cuttings; (3) lubrication to points of high friction contact at the bit and elsewhere downhole; (4) heat transfer from downhole operations to the surface; and (5) a liquid medium through which sonic telemetry can enable communication between operators at the surface and downhole equipment.

The act of circulating drilling mud through the borehole during drilling operations inevitably causes particulate matter ("solids") encountered in subterranean formations to become mixed in with the mud. Larger particles are suspended in the mud, while smaller particles may become dissolved. As mud returns to the surface after a downhole circulation cycle, it must be "cleaned" (i.e. the solids must be removed) before the mud can be circulated downhole again.

Several mechanical techniques are known in the art for removing larger particles in drilling mud during drilling operations. These mechanical techniques gravity pouring the mud over vibrating screens and filters on machines called "shakers", and solids removal using hydrocyclones or centrifuges. Such mechanical solids removal equipment is well known to be commercially available in numerous styles and performance specifications for rig site mud cleaning during drilling operations.

Conventional shaker technology removes solids from drilling mud (for example) by causing the mud to gravity drop through a wire mesh screen. The shaker "shakes" the screen to enhance the gravity flow of mud through the screen, while leaving the solids behind on the screen. Quick removal and replacement of screens assists in the overall processing efficiency through a shaker solids removal phase. Conventional shaker screens often have to be physically removed and replaced from the inside of the shaker. Such internal removal is cumbersome and requires the operator to be unfastening a used screen from the shaker where the screen is typically covered with removed solids.

Also, there can be a tendency for mud to pool in the center of the of the shaker screen while waiting to gravity-pass through the screen. This can be especially the case if the wire mesh is at all loose on the screen frame. As a result, flow rate through the screen is reduced, since areas of screen nearer the edges of the screen frame are unused for mud throughput. Also, removed solids will tend to buildup more quickly in the center of the screen, shortening the effective service life cycle of the screen before removal and replacement is required.

Further, conventional mechanical solids removal equipment such as described above does not remove the smaller particles that become mixed with the mud during circulation through the borehole. These smaller particles may be too small to be removed by mechanical techniques such as via shakers, hydrocyclones or centrifuges. They may even be dissolved in the mud. The solids removal process needs the introduction of an additive that will help remove even very small particles.

Conventional additive dosing (or "feeding", as used in this disclosure) for small particle removal may face challenges when the additive itself comes in solid or particulate form. In such cases, the particulate additive is typically pre-mixed with water, for example, in a mixing tank in order to prepare the additive in precursor liquid form. Often the liquid additive precursor may be a suspension or an emulsion. The liquid additive precursor may then be dosed (or "fed") into the mud (or other liquid being cleaned) for improved small particle removal in the mud.

The liquid additive precursor should be thoroughly and evenly mixed in order to produce effective and predictable feeding. Prior art additive mixing tanks present challenges to such thorough precursor mixing. For example, cylindrical mixing tanks are known (such as by Alfa Loyal), whose mixing capabilities may be improved, despite being equipped with agitators. Current technology does not allow for the complete amalgamation of liquid additive. Thorough and continuous mixing in the additive mixing tank enhances the likelihood that the liquid additive precursor being fed into the mud is thoroughly mixed. Similarly, continuous mixing with a controlled flow rate through the additive mixing tank enables controlled direct feeding, advantageously without the need for a buffer tank between the mixing tank and the feeding valves. A buffer tank gives additive solids suspended or emulsified in the liquid precursor a chance to settle before feeding, even with an agitator provided in the buffer tank.

The effectiveness of the foregoing solid removal techniques may be further enhanced by a preliminary stage, where a substantial number of larger solids may be removed from the liquid being treated (e.g. drilling mud) before application of the foregoing techniques even begins. The prior art appears to lack a preliminary processing and feed system whereby raw, untreated liquid with substantial solids content may be conveniently collected, organized and preliminarily processed into a pretreated liquid that may then be fed via a controlled, continuous flow into a system delivering further solids removal. Current systems exist, with drawbacks. For example, one prior art processing system called the Pre-Screener (by Wyo-Ben, Inc.) is limited in that (1) its input tank for raw, untreated liquid is elevated, and (2) the unit feeds waste onto a non-linear shaker. Some existing systems are configured only for certain types of waste delivery vehicles. Often the vehicle has to be backed in, or specifically positioned in order to drop off raw liquid (and in the case of the Pre-Screener, the raw liquid has to be elevated to enter the system). All these drawbacks make drop off more time consuming, and can often result in accidental spillage of unprocessed industrial waste, which will require compliant cleanup.

There is therefore a need in the art to combine additives with mechanical solids removal techniques in order to provide a more complete solids control solution to such endeavors as rig site mud cleaning. There is a further need in the art for shaker screen improvements that will facilitate more efficient removal and replacement, and that will tend to reduce pooling of mud near the center of the screen during service. There is further need in the art for a continuous mixing tank to enhance the pre-mixing of additives thoroughly and evenly into liquid precursors. There is a further need in the art to make the overall process self-contained and portable, so that it can be readily used on site in many applications, including in remote sites in rugged conditions such as are often found in subterranean drilling. There is a further need in the art to improve preliminary drop-off and pretreatment systems for receiving raw, untreated liquid.

SUMMARY AND TECHNICAL ADVANTAGES

This disclosure describes the Portable Liquid Recovery System (or "PLRS"), a solids removal process that advantageously combines mechanical solids removal techniques, such as via shakers, hydrocyclones and/or centrifuges, with an additive technique for removal of smaller solids. A physical PLRS embodying the process will advantageously be self-contained and portable.

The additive used in the PLRS is selected according to the application. In drilling mud applications, currently preferred embodiments of the additive are in a class of flocculants similar to those commercially available under the acronyms "PAC" or "PAM" (Polyaluminum chlorides or polyacrylamides). More preferably, currently preferred embodiments use an additive combination of Polytec 4000 and Polytec 5000, available from Boretec Equipment of Rancho Santa. Margarita, Calif., U.S.A. Liquid additive precursors are mixed in separate mixing tanks and are then blended. The additive (comprising the 4000 and 5000 liquid blend) is then fed into the mud. The proportions of the blend will depend on the application.

In a first embodiment of the PLRS, the additive is fed into the mud between first and second passes of the liquid through a food grade centrifuge. Currently preferred embodiments of the centrifuge are purpose-built for the PLRS, but meet performance specifications as set forth below. The first pass of the centrifuge removes all solids down to very small particles. The cleanliness of the liquid at this point allows smaller, more controllable amounts of additive to be introduced in order to target and remove just the very small particles. Once the additive has been introduced and has done its "cleaning" work (such as, for example, a flocculation-type process in drilling mud applications), the liquid is passed through the food grade centrifuge again to remove both the additive and the very small particles. The output of the second centrifuge pass is thus very clean.

In a second, and currently preferred embodiment of the PLRS, the additive is fed into the mud after cyclone treatment and before centrifuge treatment. In many applications using this second embodiment, a pass through a first centrifuge is all that is required to achieve solids removal specifications. In other applications, a pass through a second centrifuge may also be required.

It is therefore a technical advantage of the PLRS to remove particulate matter from liquids such as drilling muds to a level of cleanliness not previously achieved by conventional solids removal equipment. When applied to dirty water (such as sewage, for example), the PLRS will remove solids, fines, heavy metals and bacteria to produce much cleaner treated water. In the United States and other developed countries, the treated water will not likely meet applicable standards for potable water. However, the treated water will certainly be clean enough for non-portable uses such as irrigation or disposal in open waterways. In other countries, the treated water may meet applicable specifications in those countries for portable water.

Another technical advantage of the PLRS is that it may be embodied on a physical treatment system that is self-contained and portable. These features will facilitate use of the PLRS in many individual deployments and applications.

Another technical advantage of the PLRS is that by adding the additive to the liquid at a stage where only very small particles remain, the amount of additive required can be optimized. Smaller amounts of additive may be used than might be used in the prior art, optimizing costs. Also, the additive process in the PLRS may target very small particles of a specific size for removal, since only such particles are present. The PLRS additive process is thus highly controllable.

Another technical advantage of the PLRS is that it is adaptable to be continuous (rather than a "batch process", as is often seen in the prior art). Shaker, hydrocyclone and centrifuge throughput may be controlled individually to keep the cleaning process continuous at a substantially constant rate. Likewise, continuous additive mixing tanks as described herein enable highly efficient and thorough mixing at controllable output flow rates. Thus, liquid additive precursor preparation and feeding may be characterized to generate a continuous throughput of additive to supply the overall continuous cleaning rate dictated by other stages.

Some embodiments of shaker screens on the PLRS may provide externally-actuated rack and pinion mud screen locks for convenient removal and replacement of shaker screens deployed on PLRS shakers. The pinion on each lock is disposed with teeth on the inside of the shaker and a central shaft through the wall of the shaker. The pinion teeth engage corresponding rack teeth deployed on the top side of a wedge, also on the inside of the shaker. The wedge is disposed to displace laterally between the frame of the shaker screen and a lug affixed to the inside of the shaker. Rotation of the pinion's central shaft from the outside of the shaker causes lateral displacement of the wedge via the rack and pinion engagement, so that the wedge compresses down on the shaker screen frame against the lug. Multiple rack and pinion assemblies around the screen frame lock the screen to the shaker.

A technical advantage of such mud screen locks is to simplify mud screen installation, removal and re-installation during maintenance (for example). First, the disclosed mud screen lock obviates the need for multiple tools. The screen may be laid in place and then the wedges may be positioned between the screen frame and lugs on the inside wall of the shaker. Rotation of the pinion from outside the shaker locks the screen to the shaker. Second, mud screen maintenance becomes potentially cleaner. The operator spends less time unlocking and locking screens from the inside of the shaker, where substantial quantities of removed solids may be present in the area around the screen locks.

Some embodiments of the PLRS may further include an optional and, preferably, separate preliminary processing and feed system (referred to colloquially as the "jitterbug") in which raw, untreated liquid is gravity-dropped from a vehicle into an input tank. First and second augers then cooperate to generate a continuous flow of raw, untreated fluid onto a shaker for preliminary solids removal. Solids removed by the shaker may be conveyed away for further disposal, while pretreated liquid falls through the shaker into a liquid holding tank under the shaker. The pretreated liquid may then be pumped and delivered to the input point of the PLRS.

In more detail, the disclosed preliminary processing and feed system has a target processing capacity and throughput of 6,000 to 10,000 gallons per hour. The unit is easily transportable. When packed for transport, the unit fits into its own customized container with the same footprint as a standard cargo container. As will be described below, portions of the unit are set below grade level in temporary excavations. Vehicles of just about any type (and in particular, vacuum trucks and trailers) may then drive over a grating above a below-grade input tank, and drop off their entire loads of raw, untreated liquid through the grating into the input tank. Drop off is thus highly convenient, and minimizes accidental spillage of unprocessed waste that may require compliant clean up.

In preferred embodiments, a horizontally-disposed first auger is deployed near the bottom of an input tank having a V-shaped profile. The first auger transfers raw, untreated liquid to a second auger. The second auger is set at an incline, lifting the liquid as the liquid passes through the second auger. The second auger carries the liquid from the input tank to a point at which the second auger feeds the raw, untreated liquid onto a conventional high capacity shaker. The shaker separates the solids from the liquid. Separated (pretreated) liquid drops from the shaker into a pretreated liquid holding tank (which may also be below grade in some embodiments). The pretreated liquid awaits further treatment by the PLRS, and is transferred to the PLRS from the holding tank via a pump and connecting line. Meanwhile, separated solids are removed from the shaker for further treatment or disposal. In some embodiments, a conventional conveyor may be provided to carry the separated solids away from the shaker.

A technical advantage of the disclosed preliminary processing and feed system is thus to be highly portable, while still processing raw, untreated liquid with a target capacity/throughput of 6,000 to 10,000 gallons per minute.

Another technical advantage of the preliminary processing and feed system is that it is suitable for quick drop off of raw, untreated liquid by any type of vehicle. The unit further requires no special positioning of the vehicle. The vehicle simply drives over a grating above the input tank, drops off its load through the grating and into the input tank, and then drives away. Accidental spillage is thereby minimized.

According to a first aspect therefore, this disclosure describes a method for removing solids from an untreated liquid, the method comprising the steps of: (a) passing the untreated liquid through at least one treatment shaker to yield a first treated liquid; (b) passing the first treated liquid through at least one hydrocyclone to yield a second treated liquid; (c) adding a particle-removing additive to the second treated liquid to yield a third treated liquid; and (d) passing the third treated liquid through at least one centrifuge to yield a fourth treated liquid.

In other embodiments, step (a) may include the substep of passing the untreated liquid through at least two treatment shakers, or step (b) may include the substep of passing the first treated liquid through at least two hydrocyclones, or step (d) may include the substep of passing the third treated liquid through at least two centrifuges.

In other embodiments, the particle-removing additive in step (c) may include at least one flocculant selected from the group consisting of: (1) a polyaluminum chloride; and (2 a polyacrylamide; and the particle-removing additive may be pre-mixed with a precursor liquid prior to addition to the second treated liquid. Alternatively, the particle-removing additive in step (c) may be a blend of at least two compounds, wherein each compound is pre-mixed with its own precursor liquid prior to blending together. At least one of the compounds may includes a flocculant selected from the group consisting of (1) a polyaluminum chloride; and (2) a polyacrylamide.

According to a second aspect, embodiments of the method of the first aspect include, prior to step (a), a preliminary liquid passings through a separate preliminary processing and feed system (PPFS) to yield the untreated liquid, the PPFS including at least one pretreatment shaker. The PPFS may further include at least one input tank for receiving the preliminary liquid, and at least one pretreated liquid holding tank for receiving the untreated liquid. Alternatively, at least one of the input tank and the pretreated liquid holding tank are located at least partially below grade level. In some embodiments, at least one auger delivers the preliminary liquid from the input tank to the pretreatment shaker. At least one auger may be a progressive pitch auger with a smaller pitch deployed near the input tank and a larger pitch deployed near the pretreatment shaker.

According to a third aspect, embodiments of the method of the first aspect may include at least one treatment shaker providing an externally-actuated screen lock, the screen lock comprising: a wedge, the wedge providing a rack disposed on a generally upward-facing side thereof; a lug, the lug rigidly fixed to the treatment shaker at a predetermined lug location inside the pretreatment shaker; a pinion, the pinion having an elongate central axial pinion shaft, the pinion shaft received inside a corresponding hole through the treatment shaker such that the pinion is located inside the treatment shaker and the pinion shaft is rotatable from outside the treatment shaker; wherein the pinion engages the rack such that rotation of the pinion against the rack displaces the wedge laterally; such that when the wedge is interposed between the lug and a screen resting atop a screen frame, rotation of the pinion shaft from outside the pretreatment shaker compresses the screen against the screen frame.

According to a fourth aspect, embodiments of the method of the first aspect may include the particle-removing additive in step (c) being pre-mixed with a precursor liquid in a mixing tank prior to addition to the second treated liquid, the mixing tank comprising: at least two neighboring chambers, each chamber having a chamber top and a chamber bottom, each chamber further having at least one impeller, wherein rotation of each impeller encourages flow within the corresponding chamber from the chamber top to the chamber bottom; wherein fluid flow between at least two neighboring chambers is separated by a baffle assembly, the baffle assembly including first, second and third baffles in order of fluid flow between chambers; wherein the first baffle is open at the chamber bottom and closed off at the chamber top; wherein the second baffle is closed at the chamber bottom and open at the chamber top; and wherein the third baffle is open at the chamber bottom and closed at the chamber top. In some embodiments, the second baffle may have a top edge proximate the chamber top, the second baffle further including serrations on the top edge. In other embodiments, the second baffle may have a bottom edge proximate the chamber bottom, the second baffle further including a cleaning door on the bottom edge such that the cleaning door when open permits fluid flow between neighboring chambers, the cleaning door further including a door handle for opening and closing the cleaning door, wherein the door handle is actuated from outside the chambers.

Method embodiments herein described may be continuous.

The foregoing has rather broadly outlined some features and technical advantages of the disclosed technology, in order that the following detailed description may be better understood. Additional features and advantages of the disclosed technology may be described. It should be appreciated by those skilled in the art that the conception and the specific embodiments disclosed may be readily utilized as a basis for modifying or designing other structures for carrying out the same inventive proposes of the disclosed technology, and that these equivalent constructions do not depart from the spirit and scope of the technology as described.

BRIEF DESCRIPTION OF THE DRAWINGS

For a more complete understanding of the embodiments described in this disclosure, and their advantages, reference is made to the following detailed description taken in conjunction with the accompanying drawings, in which.

DETAILED DESCRIPTION

Figure 1A:
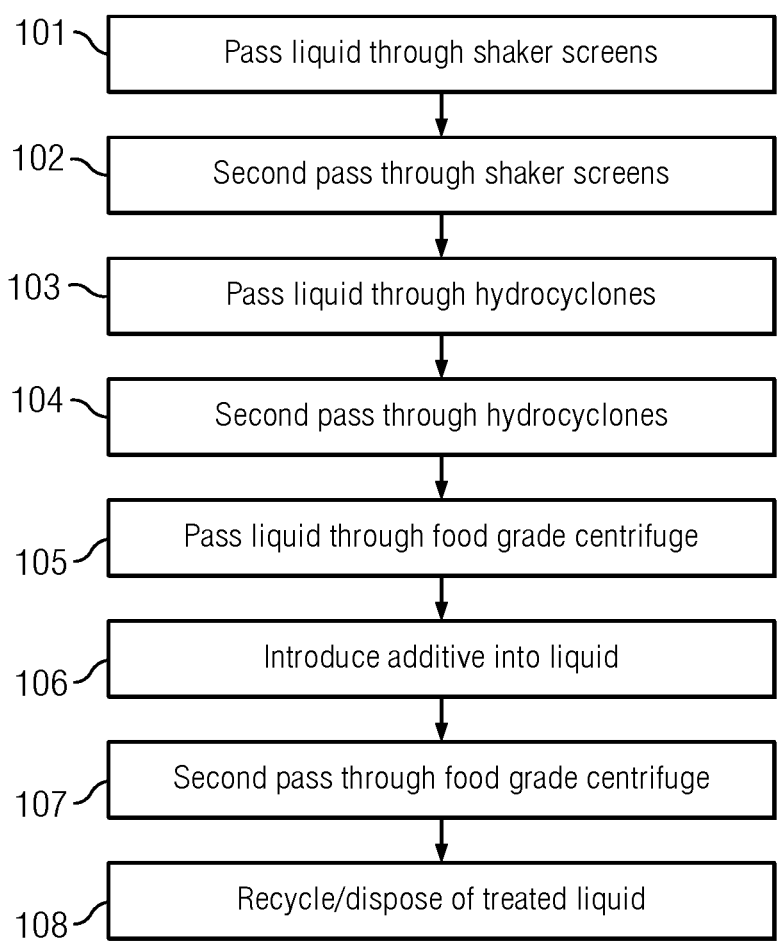
FIG. 1A is a flow chart illustrating a first embodiment of the process enabled by the disclosed Portable Liquid Recovery System ("PLRS")

FIG. 1A is a flow chart illustrating a first embodiment of a process enabled by the disclosed Portable Liquid Recovery System ("PLRS") technology. A high volume pump (30 hp, for example) delivers liquid to be treated. The PLRS process begins at block 101, where the liquid to be treated undergoes large and medium solids removal via conventional shaker technology. In block 101, a first pass is made through a shaker using larger mesh screens and filters. In block 102, a second pass is made through a shaker using smaller mesh screens and filters.

In blocks 103 and 104 on FIG. 1A, the liquid under treatment moves on to solids removal via conventional hydrocyclones (also known in the art as hydrocones, cyclones, or colloquially just "cones"). Centripetal force exerted by the hydrocyclones removes solids that were too small to be removed in blocks 101 and 102 by shakers. Advantageously the liquid is passed through the hydrocyclones twice (block 103 then block 104) in order to maximize the solids removal by hydrocyclone action. In one currently favored embodiment, 5-inch hydrocyclones are used, with a performance goal of removing 85-90% of the remaining solids within the liquid in each pass through.

In block 105 on FIG. 1A, the liquid under treatment moves on to solids removal via food grade centrifuge separation. In currently preferred embodiments, centrifuges are custom made with the following target specifications:
Rotation speed 3000-5000 rpm
Overall dimensions—20" bowl diameter, 91" length
Separation force—at least 4,200 G
Throughput—100 gal/minute Following shaker and hydrocyclone treatment in blocks 101 through 104, only very fine particulate matter (of a size measured in microns) will be left suspended in the liquid coming into centrifuge treatment in block 105. A performance goal of solids removal via centrifuge action in block 105 is for particulate matter leaving the centrifuge on a first pass to have a size no larger than 3 microns. In this way, the first pass centrifuge step in block 105 is focused on removing specific particles (in currently preferred embodiments, in a range of 3-15 microns), allowing the G-force exerted by the centrifuge to be characterized to focus on that particle size.

In block 106 on FIG. 1A, the liquid under treatment moves on to an additive process that removes very small particles (3 microns or less), bacteria and other impurities still suspended or even dissolved in the liquid. As noted earlier, the additive is selected according to the application. In drilling mud applications, currently preferred embodiments of the additive are in a class of flocculants similar to those commercially available under the acronyms "PAC" or "PAM" (Polyaluminum chlorides or polyacrylamides).

Since the particles remediated by the additive are now very small (as noted, in a range of 3-15 microns after first pass centrifuge in currently preferred embodiments), the amount of additive used, and the rate at which the additive is introduced, can be optimized to address and remove just those very small particles. In currently preferred embodiments, block 106 on FIG. 1A comprises pre-mixing additive with clean water in mixing tanks, where a precursor with the correct additive concentration and other characteristics can be made on a continuous basis using techniques such as agitation and heat. The precursor is then injected into the liquid to be cleaned.

In some embodiments, the liquid then returns to a second pass of centrifuge treatment, as shown in block 107 on FIG. 1A. Such second centrifuge pass may remove the additive and the particles addressed by the additive left behind in flocculant form. In such embodiments, currently preferred embodiments of the centrifuges used in block 107 are similar in specification to those used in the first pass described with reference to block 105. In other embodiments, however, the second pass of centrifuge treatment (block 107) may be completely omitted.

The liquid finishes treatment after block 106 or block 107 on FIG. 1A, as applicable, and then moves on to disposal, as illustrated in block 108. The liquid may be recycled back for re-use, such as for drilling mud in drilling applications. Alternatively, in water sewage treatment applications, the cleaned water is clean enough to be used for irrigation or may be disposed of in open waterways. As noted above, in the United States, the treated liquid (water) may or may not meet clean water standards for potable water. However, in locations outside the United States where clean drinking water standards may not be as stringent, the treated water may meet potable water standards.

Figure 1B:
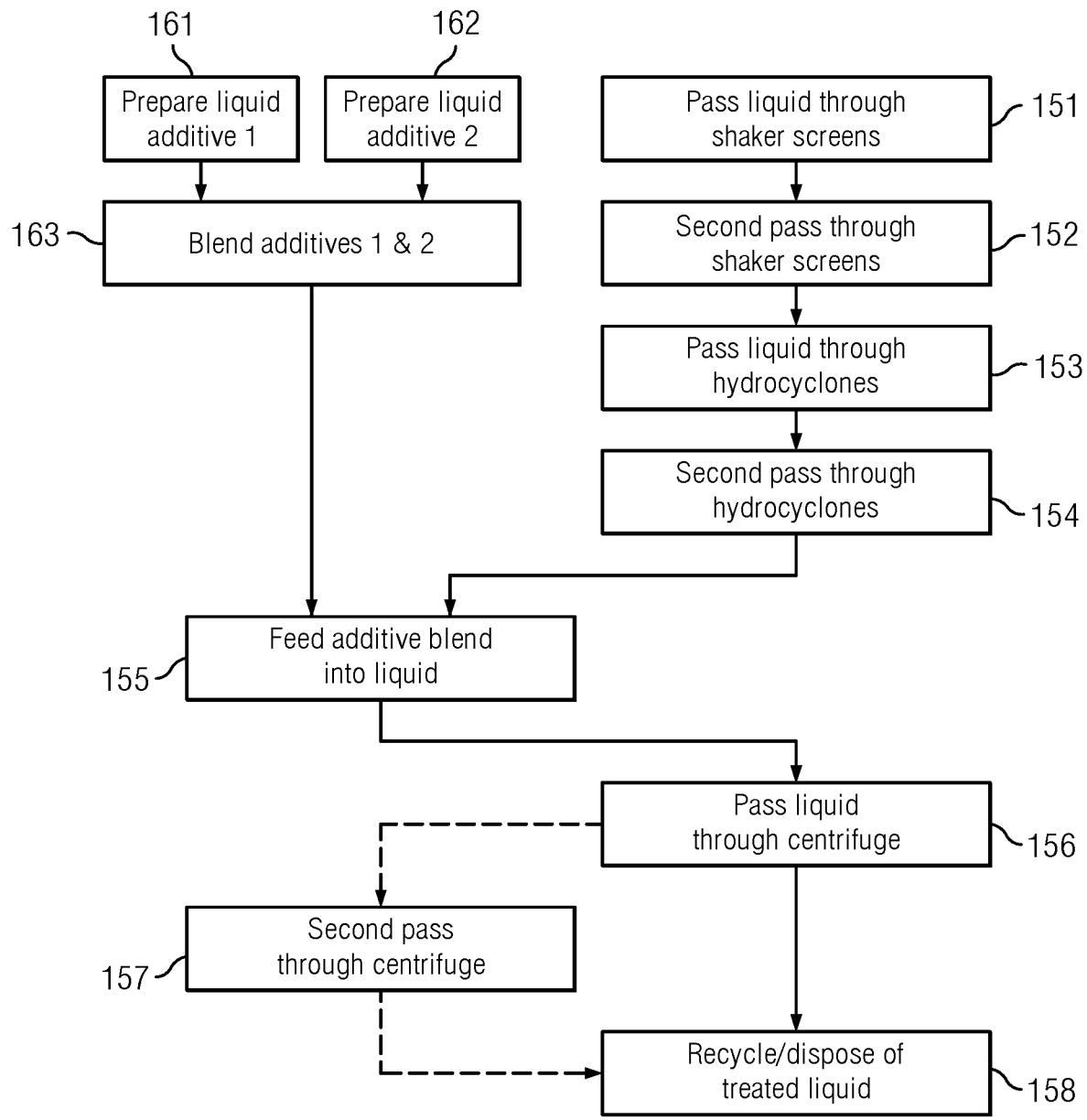
FIG. 1B is a flow chart illustrating a second and currently preferred embodiment of the process enabled by the disclosed PLRS.

FIG. 1B is a flow chart illustrating a second and currently preferred embodiment of a process enabled by the disclosed PLRS technology. It will be seen by comparison to FIG. 1A that the process of FIG. 1B is similar in some regards to the process of FIG. 1A. Notable differences exist, however.

Blocks 151 and 152 on FIG. 1B illustrate where the liquid to be treated undergoes large and medium solids removal via conventional shaker technology. In block 151, a first pass is made through a shaker using larger mesh screens and filters. In block 152, a second pass is made through a shaker using smaller mesh screens and filters. Blocks 151 and 152 on FIG. 1B are analogous to blocks 101 and 102 on FIG. 1A.

In blocks 153 and 154 on FIG. 1B, the liquid under treatment moves on to solids removal via conventional hydrocyclones (also known in the art as hydrocones, cyclones, or colloquially just "cones"). Centripetal force exerted by the hydrocyclones removes solids that were too small to be removed in blocks 151 and 152 by shakers. Advantageously the liquid is passed through the hydrocyclones twice (block 153 then block 154) in order to maximize the solids removal by hydrocyclone action. Blocks 153 and 154 on FIG. 1B are analogous to blocks 103 and 104 on FIG. 1A. As in FIG. 1A, 5-inch hydrocyclones are preferred on FIG. 1B, with a performance goal of removing 85-90% of the remaining solids within the liquid in each pass through.

FIG. 1B further depicts that in the illustrated embodiment, liquid additives 1 and 2 are prepared for blending and then feeding into the liquid to be treated (blocks 161, 162 and 163). The liquid additives are advantageously prepared in blocks 161-163 in a parallel subprocess to solids removal by shakers and hydrocylcones in blocks 151-154. Preferably two liquid additive precursors are prepared separately (as illustrated on FIG. 1B) although the scope of this disclosure is not limited in this regard. The cleaning application ill dictate how many, and which liquid additive precursors should be prepared, and the proportions in which they should be blended. In an exemplary PLRS embodiment illustrated and described below with reference to FIGS. 3A and 3B, two polyaluminum chloride or polyacrylamide ("PAC" or "PAM") flocculant-type additives (such as Polytec 4000 and 5000) in solid particulate form are mixed separately with water in continuous mixing tanks. The mixing tanks are described further in this disclosure with reference to FIGS. 4A through 4D.

Block 155 on FIG. 1B illustrates the blended liquid additive being fed into the liquid to be treated. In currently preferred embodiments, additive feeding is via an injection process as the liquid exits the second hydrocyclone pass in block 154 and before a first centrifuge pass in block 156. In currently preferred embodiments, centrifuges used in the process of FIG. 1B have similar specifications to those described above with reference to block 105 on FIG. 1A.

In many applications, additive treatment in block 155 of FIG. 1B and centrifuge treatment in block 156 of FIG. 1B yield a treated liquid that passes specification for solid and particulate removal. In such applications, the treated liquid is ready for recycling or disposal (block 158). In other applications, a second centrifuge pass may be optimal (block 157 before block 158 on FIG. 1A, shown in broken lines). Preferably, when required, the second pass centrifuge in block 157 is similar in specification to the first pass centrifuge described above with reference to block 156.

The liquid finishes treatment after block 156 or 157, as applicable on FIG. 1B, and then moves on to disposal, as illustrated in block 158. Analogous to block 108 on FIG. 1A, the liquid may be recycled back for re-use, such as for drilling mud in drilling applications. Alternatively, in water sewage treatment applications, the cleaned water is clean enough to be used for irrigation or may be disposed of in open waterways.

Figure 2A:
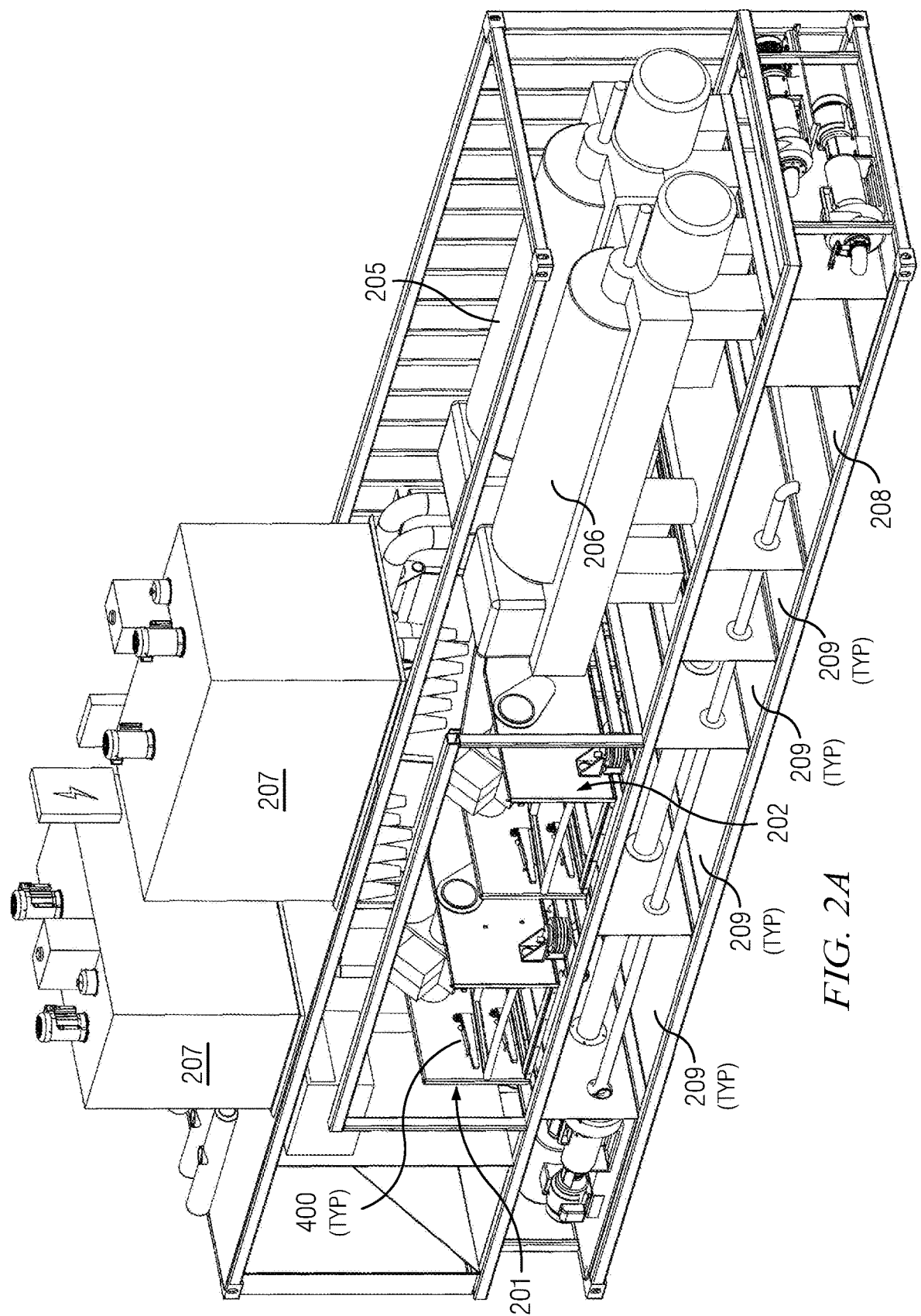
FIGS. 2A and 2B illustrate a first embodiment of a PLRS deployed on and in a customized 40-foot container, designed to operate in accordance with the process depicted on FIG. 1A.
Figure 2B:
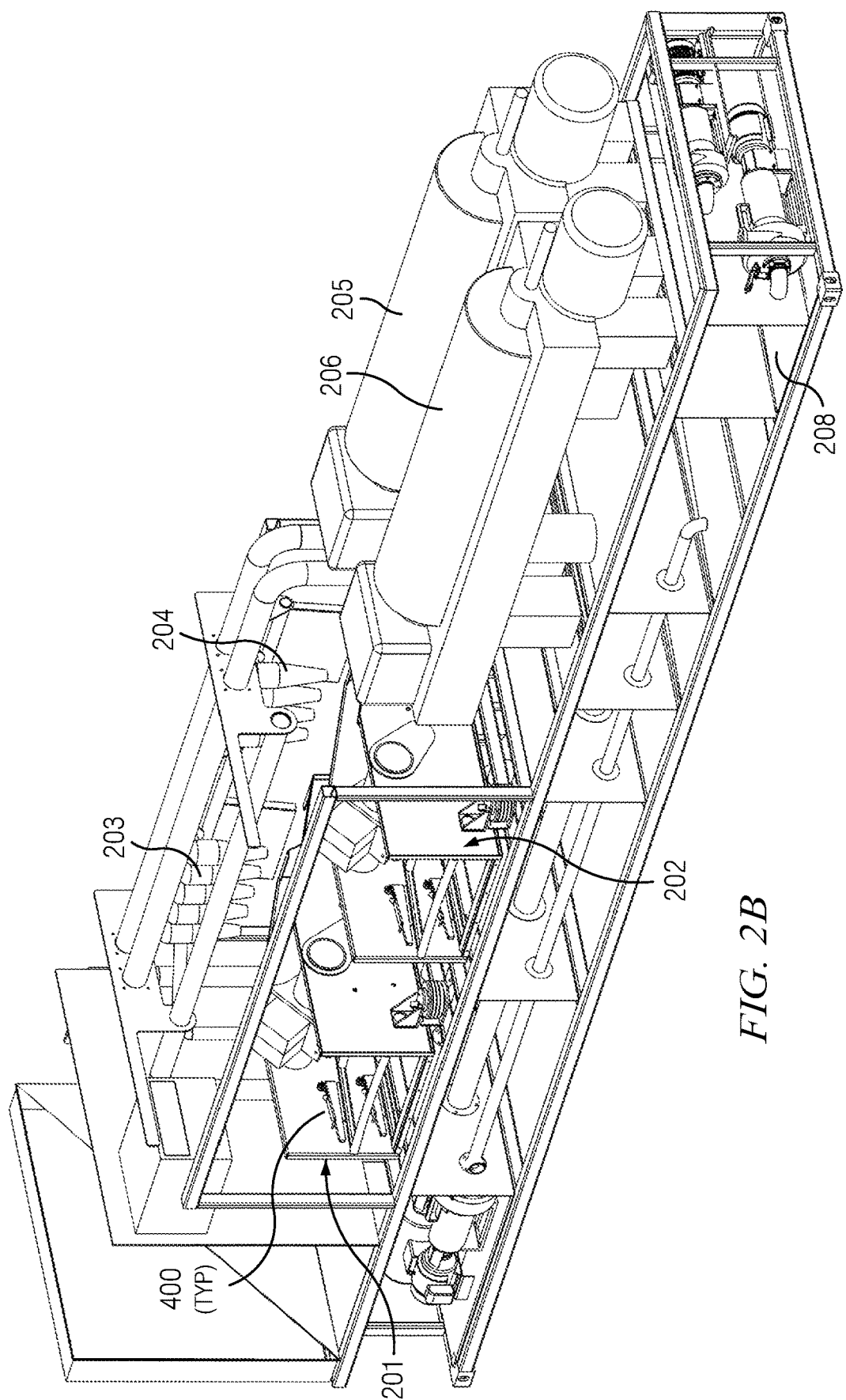

FIGS. 2A and 2B illustrate a first embodiment of a PLRS as described in this disclosure. The embodiment of FIGS. 2A and 2B is designed to treat liquid generally in accordance with the process described above with reference to FIG. 1A. The PLRS embodiment of FIGS. 2A and 2B is preferably deployed on and in a customized 40-foot container. The container is suitable to be loaded on, hauled by, and unloaded from a conventional 18-wheel tractor-trailer rig. As noted above, embodiments of the disclosed PLRS technology are designed to be self-contained and portable, so as to enable delivery of the PLRS to remote locations that may be in rugged terrain. Self-contained and portable embodiments also facilitate widespread deployment of the PLRS for domestic, commercial or regional (public utility-sized) applications.

FIGS. 2A and 2B should be viewed together. Where the same part or feature is called out on both FIGS. 2A and 2B, the part or feature has the same reference numeral. FIG. 2A depicts PLRS with the front and nearside covers removed, and part of the top removed, so that the components can be seen. FIG. 2B depicts PLRS as on FIG. 2A, except with the backside cover and the remainder of the top removed. Additive mixing tanks 207 are also hidden on FIG. 2B for improved clarity. It will be appreciated that PLRS also provides conventional electrical supply to the depicted components, and conventional pumping from one component to the next. Such conventional electrical supply and pumping supply has been either hidden for improved clarity on FIGS. 2A and 2B, or is depicted but not called out in this disclosure.

Referring first to FIG. 2A, PLRS comprises first shaker 201 (refer block 101 on FIG. 1A) and second shaker 202 (refer block 102). Now looking at FIG. 2B, PLRS also comprises first hydrocyclones 203 (refer block 103) and second hydrocyclones 204 (refer block 104).

Both FIGS. 2A and 2B depict first centrifuge 206 (refer block 105 on FIG. 1A). With particular reference to FIG. 2A, and as discussed earlier in this disclosure, liquid leaves first centrifuge 206 and passes near additive mixing tanks 207. In currently preferred embodiments, additive is pre-mixed in mixing tanks 207 as part of the continuous process achieved by the PLRS. Mixing tanks are advantageously approximately 5,000 liters in total overall capacity, and may be provided in one, two or more tanks, according to the needs of the additive mixing process. Precursor additive mixture is taken from mixing tanks 207 and then injected into the liquid being cleaned (refer block 106 on FIG. 1A).

Referring now to FIG. 2A, in PLRS embodiments in which a second centrifuge pass is included, liquid is moved to second centrifuge 205 after additive introduction (refer block 107 on FIG. 1A and associated description above). In such embodiments, second centrifuge 205 removes additive and remaining particulate matter from the liquid and deposits the clean liquid into clean product tank 208. By contrast, in PLRS embodiments in which there is no second centrifuge pass, second centrifuge 205 on FIG. 2A may be bypassed, or not even provided.

It was noted above that currently preferred embodiments of the PLRS are continuous, obviating the need for batch processing of additive. Current embodiments of the PLRS have a target overall continuous throughput of 100 gallons per minute. It will be appreciated that the flow rates and throughputs of the various components on the PLRS may be controlled and optimized independently to generate a continuous overall PLRS throughput. To that end, FIG. 2A depicts holding tanks 209 provided on the PLRS to assist control and metering of liquid flow from one component to the next.

Figure 3A:
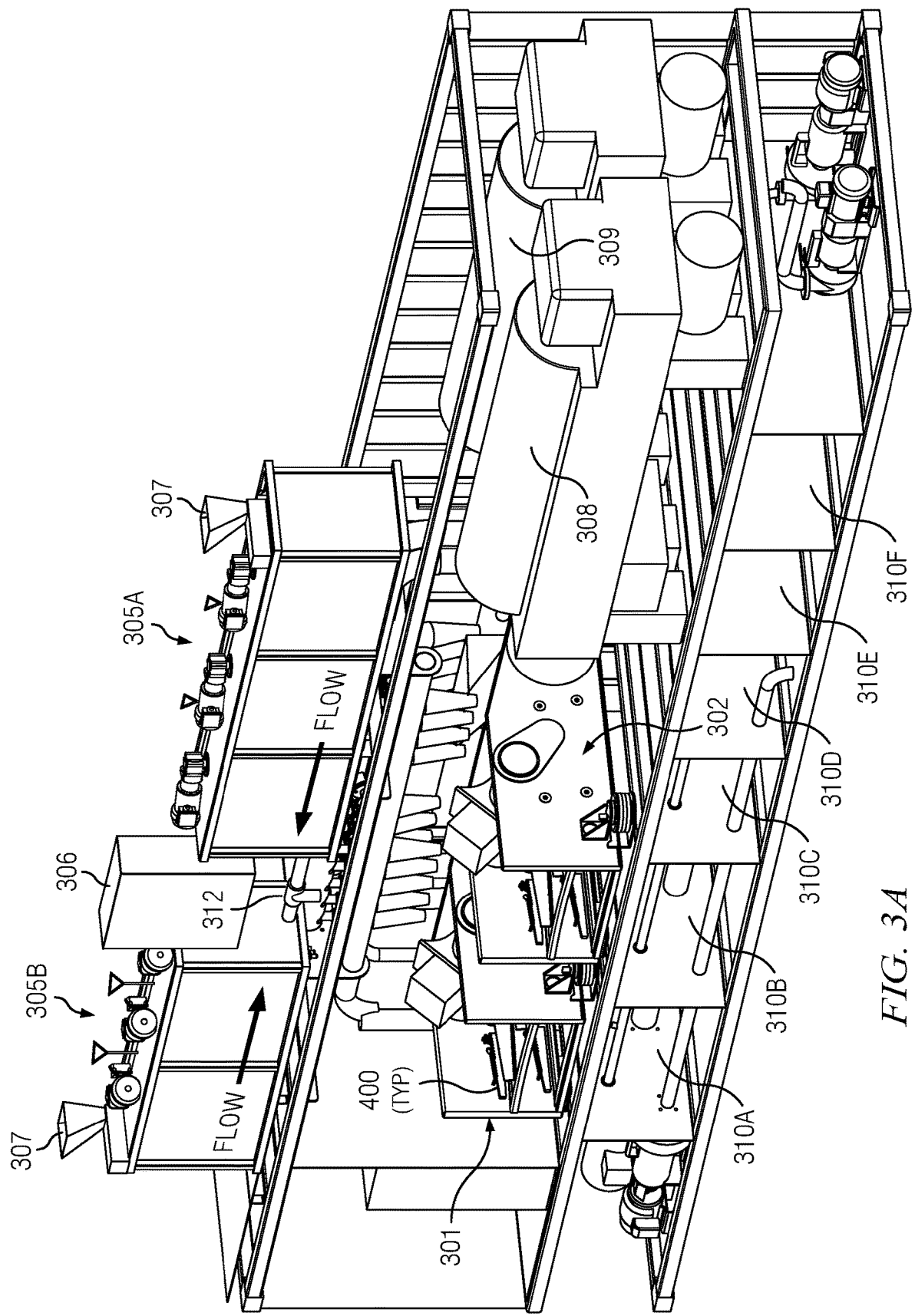
FIGS. 3A and 3B illustrate a second and currently preferred embodiment of a PLRS deployed on and in a customized 40-foot container, designed to operate in accordance with the process depicted on FIG. 1B.
Figure 3B:
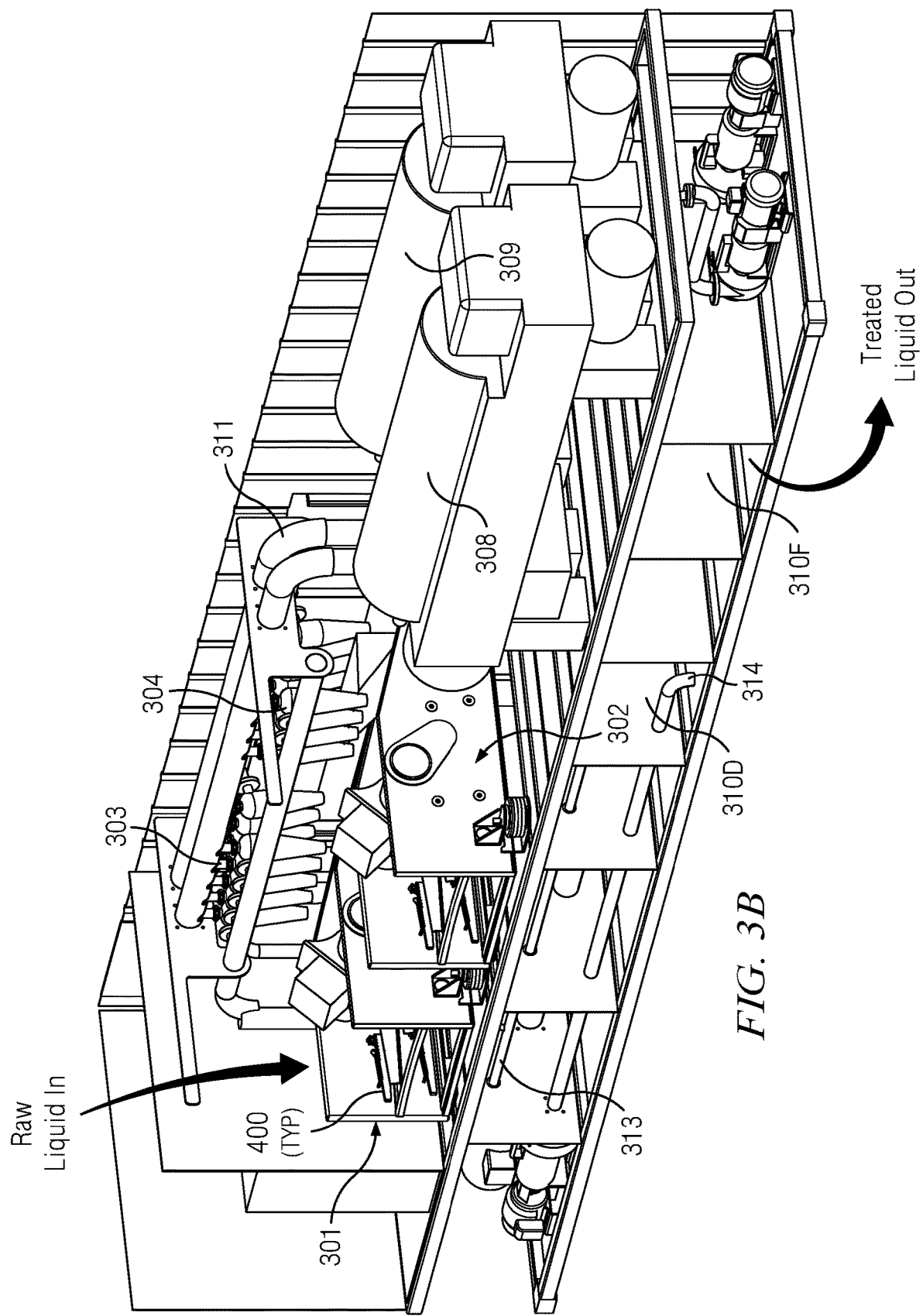

FIGS. 3A and 3B illustrate a second and currently preferred embodiment of a PLRS as described in this disclosure. The embodiment of FIGS. 3A and 3B is designed to treat liquid generally in accordance with the process described above with reference to FIG. 1B. As with the PLRS of FIGS. 2A and 2B, the PLRS embodiment of FIGS. 3A and 3B is preferably deployed on and in a customized 40-foot container. The container is suitable to be loaded on, hauled by, and unloaded from a conventional 18-wheel tractor-trailer rig. As such, the PLRS of FIGS. 3A and 3B offers widespread mobility and deployment advantages, analogous to those described above with reference to the PLRS of FIGS. 2A and 2B.

FIGS. 3A and 3B should be viewed together. Where the same part or feature is called out on both FIGS. 3A and 3B, the part or feature has the same reference numeral. FIG. 3A depicts the illustrated PLRS with the front and nearside covers removed, and part of the top removed, so that the components inside can be seen. FIG. 3B is as FIG. 3A, except with the backside cover and the remainder of the top removed. Roof level components are also hidden on FIG. 3B for improved clarity. As with the PRLS of FIGS. 2A and 2B, it will be appreciated that the PLRS of FIGS. 3A and 3B also provides conventional electrical supply to the depicted components, and conventional pumping from one component to the next. Such conventional electrical supply and pumping supply has been either hidden for improved clarity on FIGS. 3A and 3B, or is depicted but not called out in this disclosure.

Referring first to both FIGS. 3A and 3B, raw (untreated) liquid enters the depicted PLRS via flow onto first shaker 301 (refer block 151 on FIG. 1B) and then onto second shaker 302 (refer block 152). Liquid exits first shaker 301 into compartment 1 (310A), and is pumped from compartment 1 onto second shaker 302. Liquid exits second shaker 302 into compartment 2 (310B).

Continuing to refer to both FIGS. 3A and 3B, liquid is pumped from compartment 2 into first hydrocyclones 303 (refer block 153 on FIG. 1B). Liquid exits first hydrocyclones 303 and into compartment 3 (310C). Liquid is then pumped from compartment 3 into second hydrocyclones 304 (refer block 154). Liquid exits second hydrocyclones 304 and into compartment 4 (310D).

Meanwhile, liquid additive precursor is mixed in mixing tanks 305A and 305B, as shown on FIG. 3A. In the PLRS embodiment of FIGS. 3A and 3B, two liquid additives are mixed separately and then blended together, before being fed via injection into the post-hydrocyclone liquid resident in compartment 4 (310D). Refer also to blocks 161, 162, 163 and 155 on FIG. 1B. The scope of this disclosure is not limited, however, to the number and/or kind of additives that may be fed into the liquid immediately after processing by second hydrocyclones 304 and resident in compartment 4. Likewise, if more than one additive is used, the scope of this disclosure is not limited to any specific proportions of additives that may make up a blend thereof. Such parameters will depend on the application, and will be user-selected to suit.

Mixing tanks 305A and 305B on FIG. 3A are preferably continuous mixing tanks designed and operating in accordance with embodiments described below with reference to FIGS. 4A through 4D. Additives in solid particle form are introduced into mixing tanks 305A and 305B via funnels 307, at selected metered quantities and flow rates. Conventional structure for metering the additives is omitted from FIG. 3A for clarity. Precursor liquid (with which the solid additive is mixed) is also introduced into mixing tanks 305A and 305B by conventional metering devices such as valves. In one current embodiment, Polytec 4000 is introduced into mixing tank 305B, and Polytec 5000 is introduced into mixing tank 305A. As noted above, Polytec 4000 and Polytec 5000 are PAM/PAC-type flocculants in particle form suitable for solids removal from drilling mud, and are available from Boretec Equipment in Rancho Santa Margarita in California, U.S.A. In the PLRS of FIGS. 3A and 3B, both PolyTec additives are mixed with water in mixing tanks 305A and 305B before blending and injection into drilling mud resident in compartment 4 (310D). Mixing tank 305A on FIG. 3A is shown larger than mixing tank 304A because in the embodiment described immediately above, Polytec 5000 requires more mixing than Polytec 4000.

Flow inside mixing tanks 305A and 305B is as noted on FIG. 3A. Injector 312 blends the liquid additives exiting mixing tanks 305A and 305B, and feeds the blended liquid additive along additive feed line 313 and into compartment 4 (310D). The post-hydrocyclone liquid in compartment 4 may then undergo solids removal processing by the injected additive.

Liquid is then pumped from compartment 4 through centrifuge feed line 314 (shown on FIG. 3B) and into centrifuges 308 and 309. It will be seen on FIGS. 3A and 3B that centrifuge feed line 312 preferably follows an extended route in delivering liquid from compartment 4 (310D) to centrifuges 308, 309. This is to allow additional time for the liquid to undergo solids removal processing by the injected additive while in an extended centrifuge feed line 312, before beginning the centrifuge phase.

As described above, one or both centrifuges 308, 309 may be required to finish treatment of the liquid to solids removal specification, depending on the application (refer to blocks 156 and 157 on FIG. 1B and associated description above). In embodiments where only one centrifuge pass is provided, one of centrifuges 308, 309 may be bypassed or not even provided on the PLRS structure.

Once centrifuge treatment is complete, liquid exits centrifuges 308 and/or 309, as applicable, and moves into compartment 5 (310E on FIG. 3A). Compartment 5 is a settling tank that supplies output tank in compartment 6 (310F). Fully treated liquid may then be taken from compartment 6, as shown on FIG. 3B (refer also to block 158 on FIG. 1B).

With further reference to FIG. 3A, electrical box 306 houses conventional electrical hardware for power to and control over components illustrated and described with reference to FIGS. 3A and 3B. With further reference to FIGS. 2A, 2B, 3A and 3B, rack and pinion mud screen locks 400 are shown deployed on shakers 201, 201, 301 and 302. Such rack and pinion mud screen locks 400 are described in more detail below with reference to FIGS. 5A through 5C.

Figure 4A:
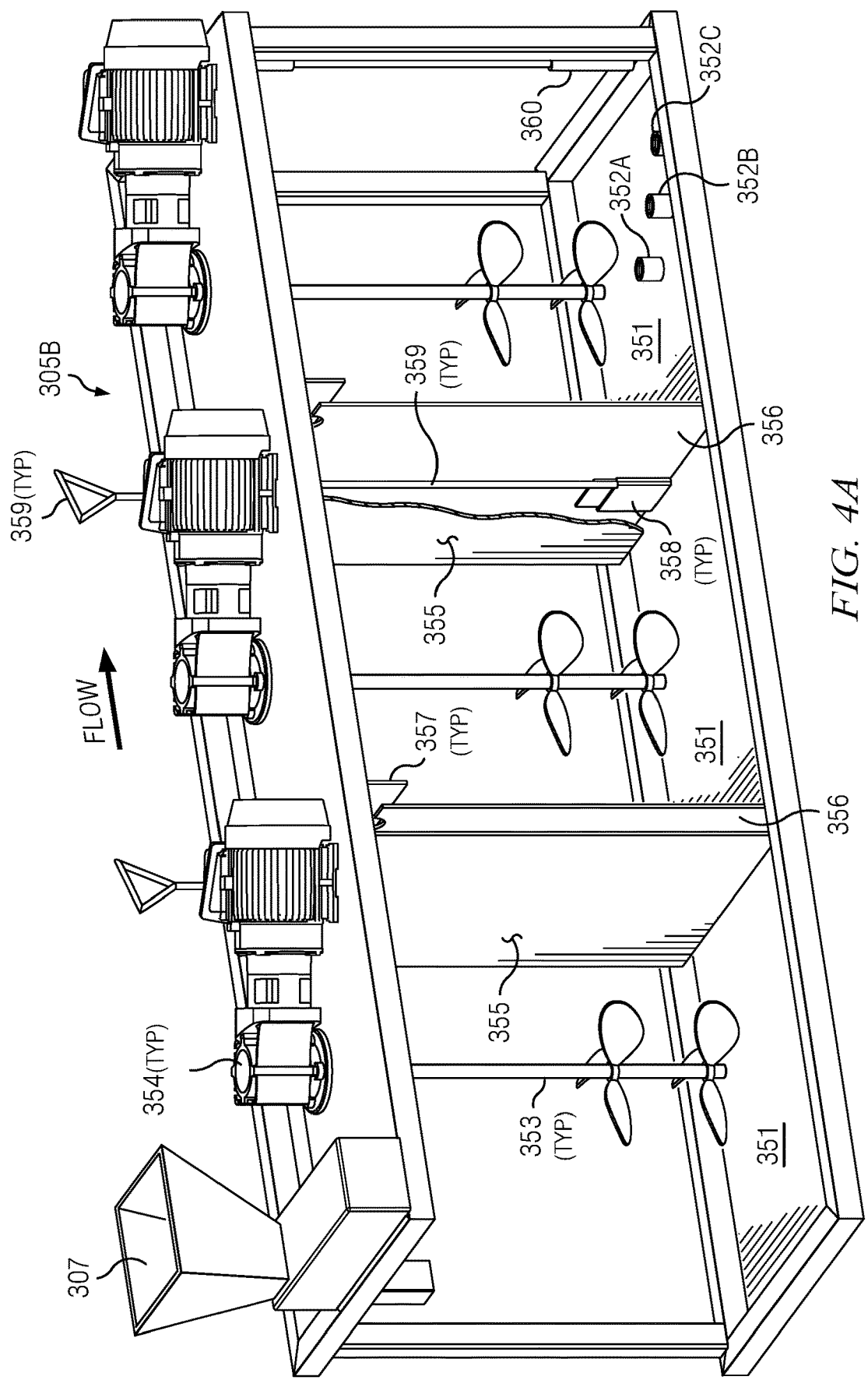
FIGS. 4A through 4C illustrate the internals components and operation of a presently preferred embodiment of a continuous mixing tank as described in this disclosure, such as mixing tanks 305A, 305B shown on FIG. 3A.
Figure 4B:
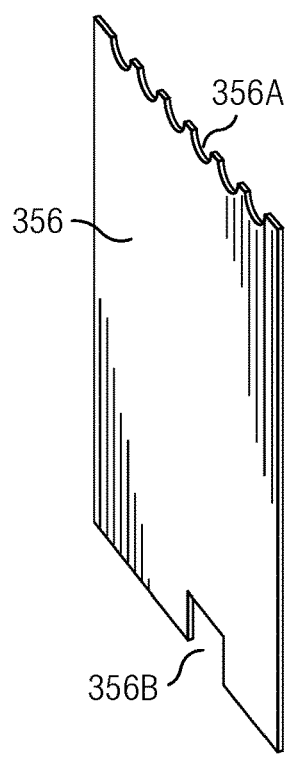
Figure 4C:
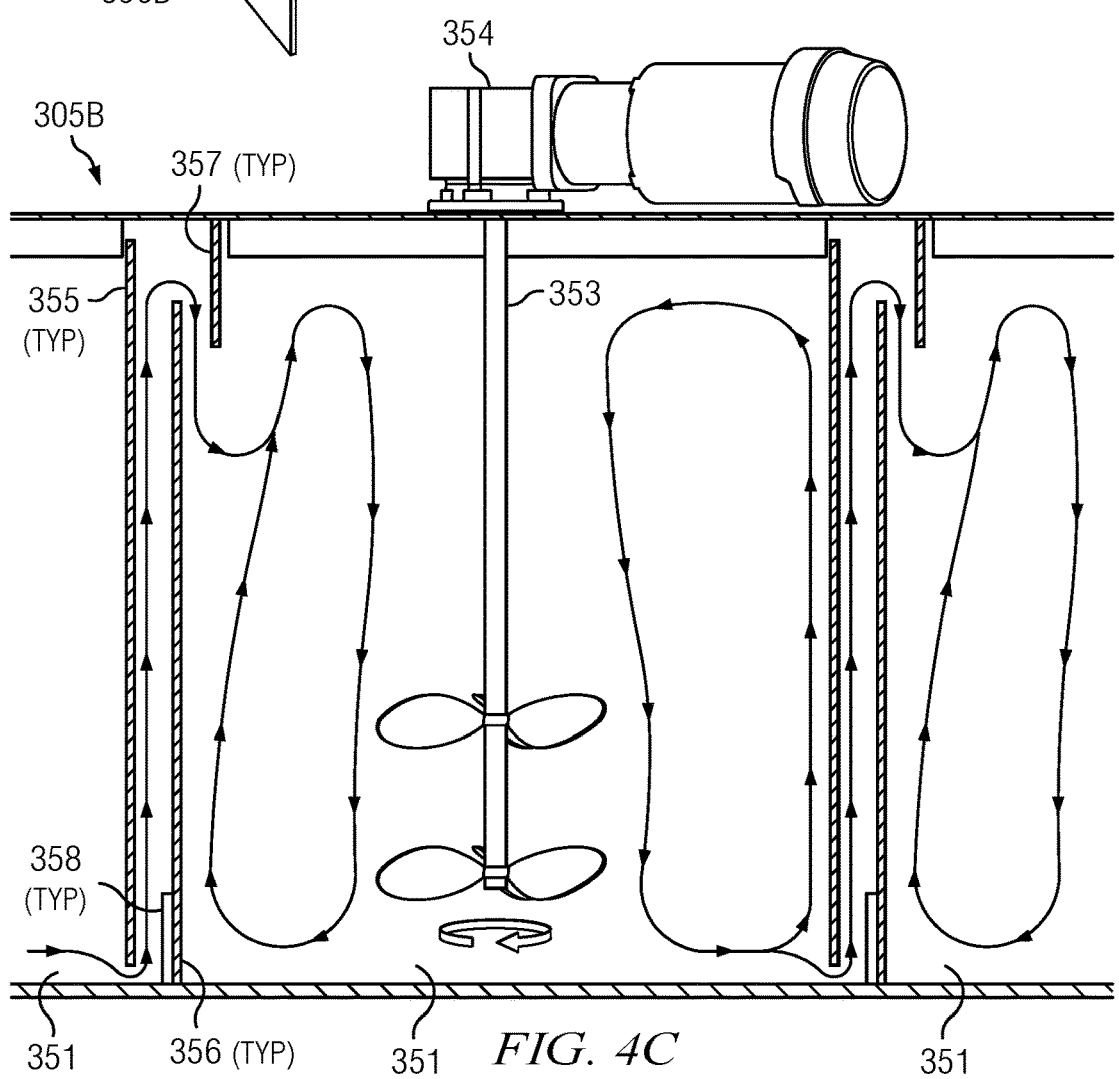

FIGS. 4A through 4C further illustrate the internals, components and operation of a currently preferred embodiment of continuous mixing tank 305A, 305B as shown on FIG. 3A. FIGS. 4A through 4C should be viewed together. Where the same part or feature is called out on any of FIGS. 4A through 4C, the part or feature has the same reference numeral on others of FIGS. 4A through 4C. Although FIGS. 4A through 4C depict mixing tank 305B from FIG. 3A, it will be understood that in preferred embodiments, mixing tank 305A on FIG. 3A is a reverse but similar structure to mixing tank 305B as illustrated and described with reference to FIGS. 4A through 4C.

FIG. 4A depicts mixing tank 305B from FIG. 3A in perspective view. The outer side walls of mixing tank 305B have been removed so that the internals can be seen. FIG. 4A further depicts one of first baffles 355 partially removed, so that cleaning door mechanism 358 and cleaning door handle 359 on second baffle 356 may be better seen. FIG. 4B is a view of second baffle 356 in isolation. FIG. 4C illustrates exemplary flow paths in each consecutive mixing chambers 351 in mixing tank 305B.

Referring first to FIG. 4A, it will be seen that mixing tank comprises a plurality of consecutive mixing chambers 351. Although FIGS. 4A through 4C illustrate nixing tank 351 comprising three mixing chambers 351, the scope of this disclosure is not limited in this regard, and continuous mixing tanks consistent with the scope of this disclosure may provide any plurality of consecutive mixing chambers 351 of selected size, per user design.

FIG. 4A also shows each mixing chamber 351 providing impeller 353, driven by motor 354. In preferred embodiments, impeller 353 is a double impeller selected to promote mixing in its chamber 351, although again the scope of this disclosure is not limited in this regard. FIG. 4A further shows mixing chambers 351 internally separated by a series of combinations of baffles, each designed to control flow between mixing chambers 351. In preferred and illustrated embodiments, each baffle combination comprises first, second and third baffles 355, 356 and 357. With momentary reference to FIG. 4D, first baffle 355 is open at the bottom of mixing chambers 351, second baffle 356 is open at the top of mixing chambers 351, and third baffle 357 is open at the bottom of chambers 351 again. It will be nonetheless appreciated that the scope of this disclosure is not limited to any particular baffle combination, and other baffle combinations may be designed according to the application.

Returning now to FIG. 4A, flow between mixing chambers 351 is indicated from left to right by the arrow marked "FLOW". Per disclosure above with reference to FIG. 3A, additive in solid particle form is metered into first mixing chamber 351 through funnel 307. The liquid into which the additive will be mixed is also introduced first mixing chamber 351. In preferred embodiments, such liquid is water, although the scope of this disclosure is not limited in this regard. Piping, valves, etc. for introducing liquid into first chamber 351 is conventional, and has been omitted from FIG. 4A for clarity. In preferred embodiments, a serviceable continuous flow through mixing tank 305B has been achieved when liquid is initially introduced for mixing at about 5-9 liters per minute.

It will thus be appreciated from FIGS. 4A and 4C that each impeller 353 promotes additive mixing with the liquid in its corresponding chamber 351, while the flow paths between mixing chambers 351 created by baffles 355, 356, 357 promote continuous flow through the overall mixing tank 305B. The exemplary flow paths illustrated on FIG. 4C are self-explanatory, and demonstrate how such continuous mixing and continuous throughput occurs in each mixing chamber 351.

Returning to FIG. 4A, the final (right hand) mixing chamber 351 depicts three conventional outlets 352A, 352B and 352C. In preferred embodiments a first outlet 352A is a drain, a second outlet 352B is an operational outlet to an injector, for example (see injector 312 on FIG. 3A with associated disclosure), and a third outlet 352C may be held redundant or saved for future use. The final (right hand) mixing chamber 351 on FIG. 4D also depicts float alarm 358. Float alarm 360 is conventional, and will sound (and/or cut power) in the event of liquid levels exceeding designated high and/or low levels.

As noted above, FIG. 4A further illustrates one of first baffles 355 removed, so that cleaning door mechanism 358 and cleaning door handle 359 on second baffle 356 may be better seen. FIG. 4B is a view of second baffle 356 in isolation, and illustrates serrations 356A formed in the top edge of second baffle 356, and cleaning door opening 356B provided in the bottom edge of second baffle 356.

With further reference now to FIGS. 4A and 4B together, cleaning door mechanisms 358 are provided between mixing chambers 351 in order to assist draining and cleaning of mixing tank 305B for maintenance or other reasons. During normal mixing tank service, cleaning door mechanisms 358 remain closed. When cleaning door handle 359 is raised, however, a trap door at the end thereof slides up and allows flow between adjacent mixing chambers 351 through cleaning door opening 356B in second baffle 356. Mixing tank 305B may thus be drained. Sludge or sediment in the bottom of mixing chambers 351 may also be accumulated through cleaning door openings 356B into one mixing chamber 351 for more convenient removal Referring to FIG. 4B, serrations 356A are provided on the top of second baffle 356 in recognition of mixing tank 305B not always being perfectly level. Serrations 356A promote even flow over second baffle 356 even if mixing tank 305B is slightly off level.

Referring to FIG. 4C, third baffle 357's length is selected to encourage flow downwards into mixing chamber 351, rather than horizontally, as liquid passes over second baffle 356. This has been found to promote better mixing in each chamber 351 while still maintaining desired overall throughput between chambers 351.

Figure 5A:
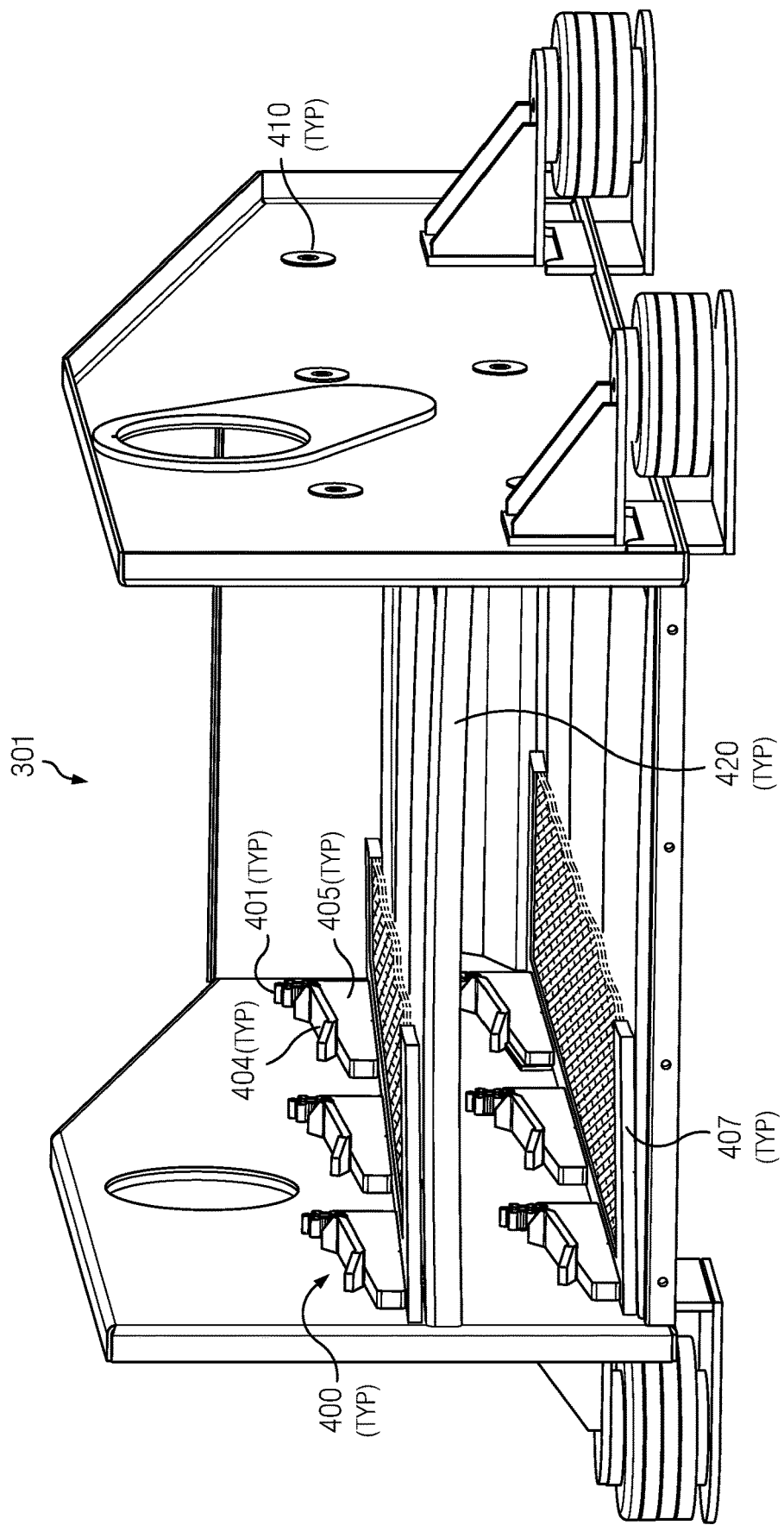
FIGS. 5A and 5B illustrate an embodiment of an externally-actuated rack and pinion mud screen lock 400 suitable for convenient removal and replacement of shaker screens as described in this disclosure.
Figure 5B:
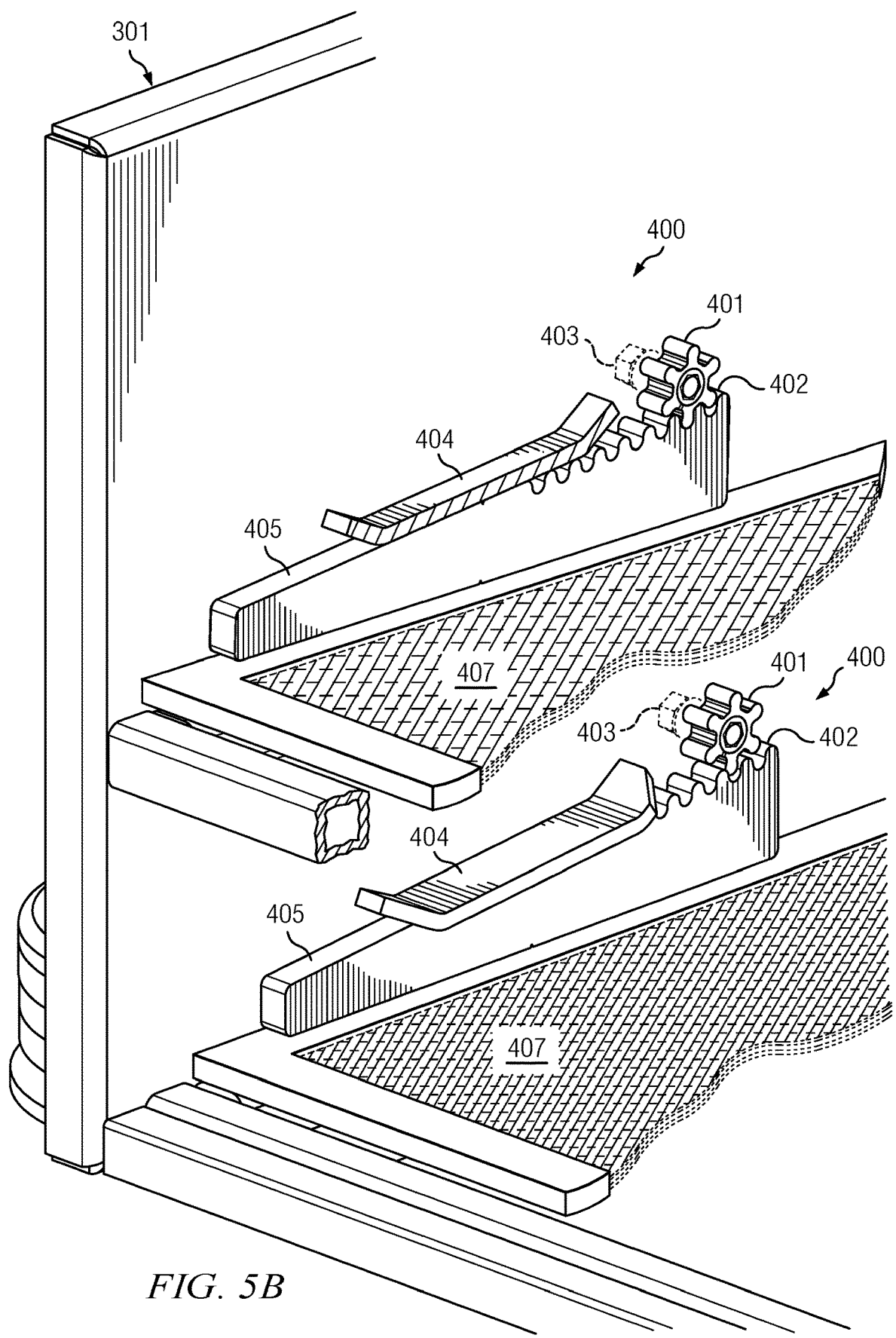

FIGS. 5A and 5B illustrate one embodiment of an externally-actuated rack and pinion mud screen lock 400 for convenient removal and replacement of shaker screens 407 deployed on shakers 201, 202, 301 and 302 (as also shown on FIGS. 2A, 2B, 3A and 3B). FIGS. 5A and 5B should be viewed together. Where the same part or feature is called out on any of FIG. 5A or 5B, the part or feature has the same reference numeral on others of FIGS. 5A and 5B. Although FIGS. 5A and 5B depict shaker 301 from FIGS. 3A and 3B, it will be understood that in preferred embodiments, rack and pinion mud screen locks 400 as shown on FIGS. 5A and 5B may be deployed on any (or all) of shakers 201, 202, 301 and 302 (as illustrated on FIGS. 2A, 2B, 3A and 3B).

Referring first to FIG. 5A, mud screen locks 400 are shown located to lock down mud screens 407 on screen frames 420. In the example of shaker 301 as illustrated on FIG. 5A, twelve (12) mud screen locks 400 are shown, six (6) distributed evenly around the periphery of each of two (2) screens 407. It will be appreciated, however, that the scope of this disclosure is not limited in this regard, and the number and distribution of mud screen locks 400 may be selected according to sizes and needs of individual shakers.

Referring now to FIG. 5B, mud screen locks 400 comprise pinion 401 and wedge 405. Pinion 401 has a central shaft 403, with preferably a hexagonal profile at the far end thereof, suitable for turning pinion 401 with a socket wrench or similar. Wedge 405 provides a rack 402 on one edge thereof for engagement with pinion 401. Wedges 405 of mud screen locks 400 operate against lugs 404.

Referring now to FIG. 5A again, lugs 404 are affixed to the internal sides of shaker 301 by welding or other suitable attachment. Mud screen locks 400 on FIG. 5A are generally free to move, except that central shafts 403 are located through side holes 410 in shaker 301 such that central shafts 403 may be turned (actuated) from outside shaker 301. In operation, mud screen 407 is slid over screen frame 420 and under mud screen locks 400. Once screen 407 is positioned as desired on frame 420, central shafts 403 on mud screen locks 400 may be turned from outside shaker 301 through side holes 410. Turning central shafts 403 actuates pinions 401 on racks 402, causing wedges 405 to displace laterally and compress screen 407 down against lugs 404. Once a desired compression is reached to hold screen 407 in place, conventional jam nuts (not illustrated) are tightened over central shafts 403, again from outside shaker 301, to retain central shafts 403, pinions 401, racks 402 and wedges 405 in position during shaking operations.

Releasing mud screen locks 400 is essentially the reverse procedure. Jam nuts are released, and central shafts 403 are turned from outside shaker 301 to actuate pinions 401 and racks 402 to release wedges 405.

FIG. 5A also illustrates that in preferred embodiments, screen frames 420 are bowed slightly upwards. In such embodiments, mud screen locks 400 operate to hold down screen 407 over frame 420 such that screen 407 will have a corresponding slight upward curvature during shaker operations. This slight upward curvature feature deters pooling of liquid in the center of the screen 407 during shaker operations, and promotes flow through and across the entire mud screen.

Figure 6A:
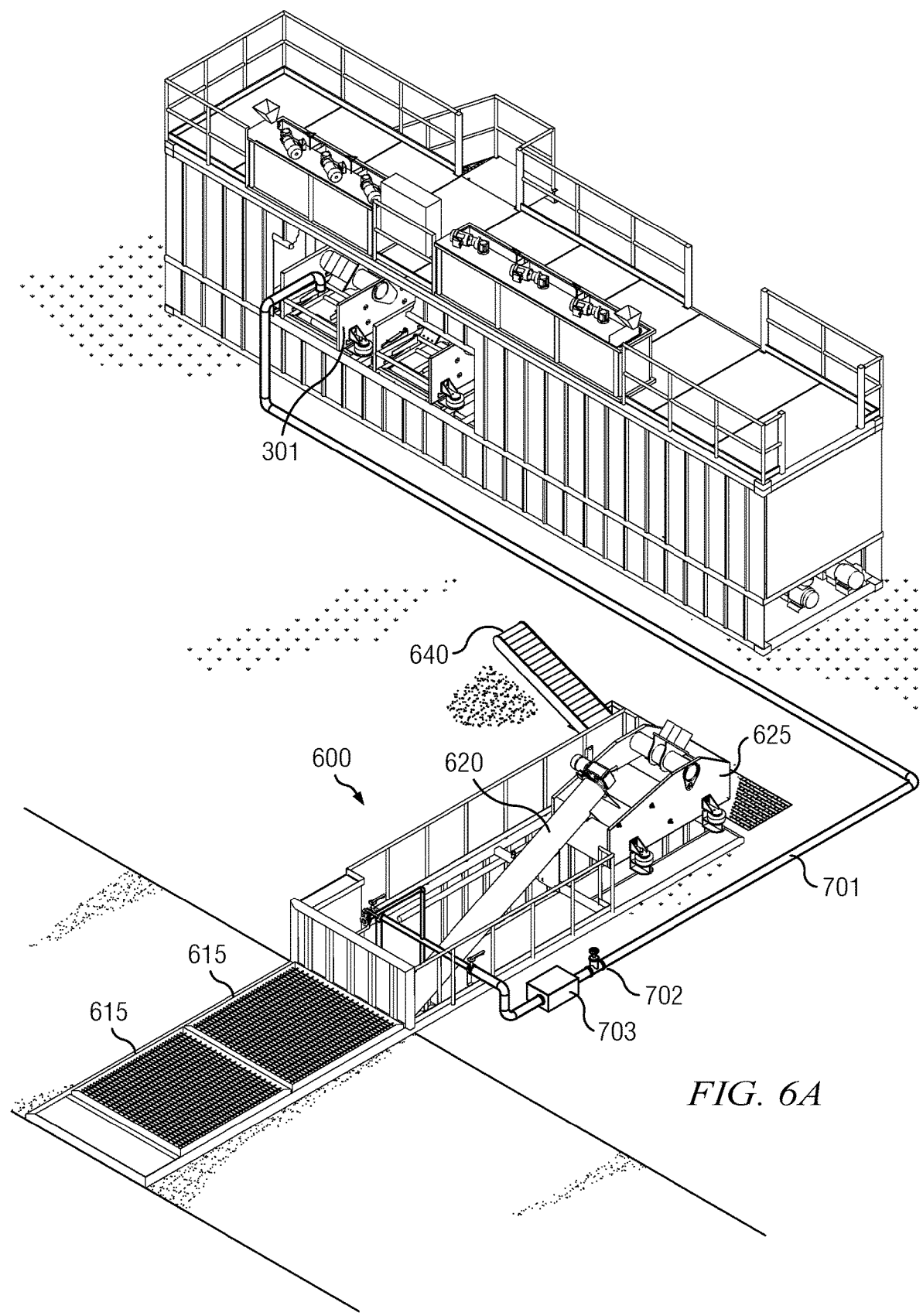
FIG. 6A illustrates a currently preferred embodiment of optional preliminary processing and feed system 600 in position to receive raw, untreated liquid, and then pretreat the liquid before feeding the pretreated liquid to a. PLRS consistent with the embodiment of FIGS. 3A and 3B.
Figure 6B:
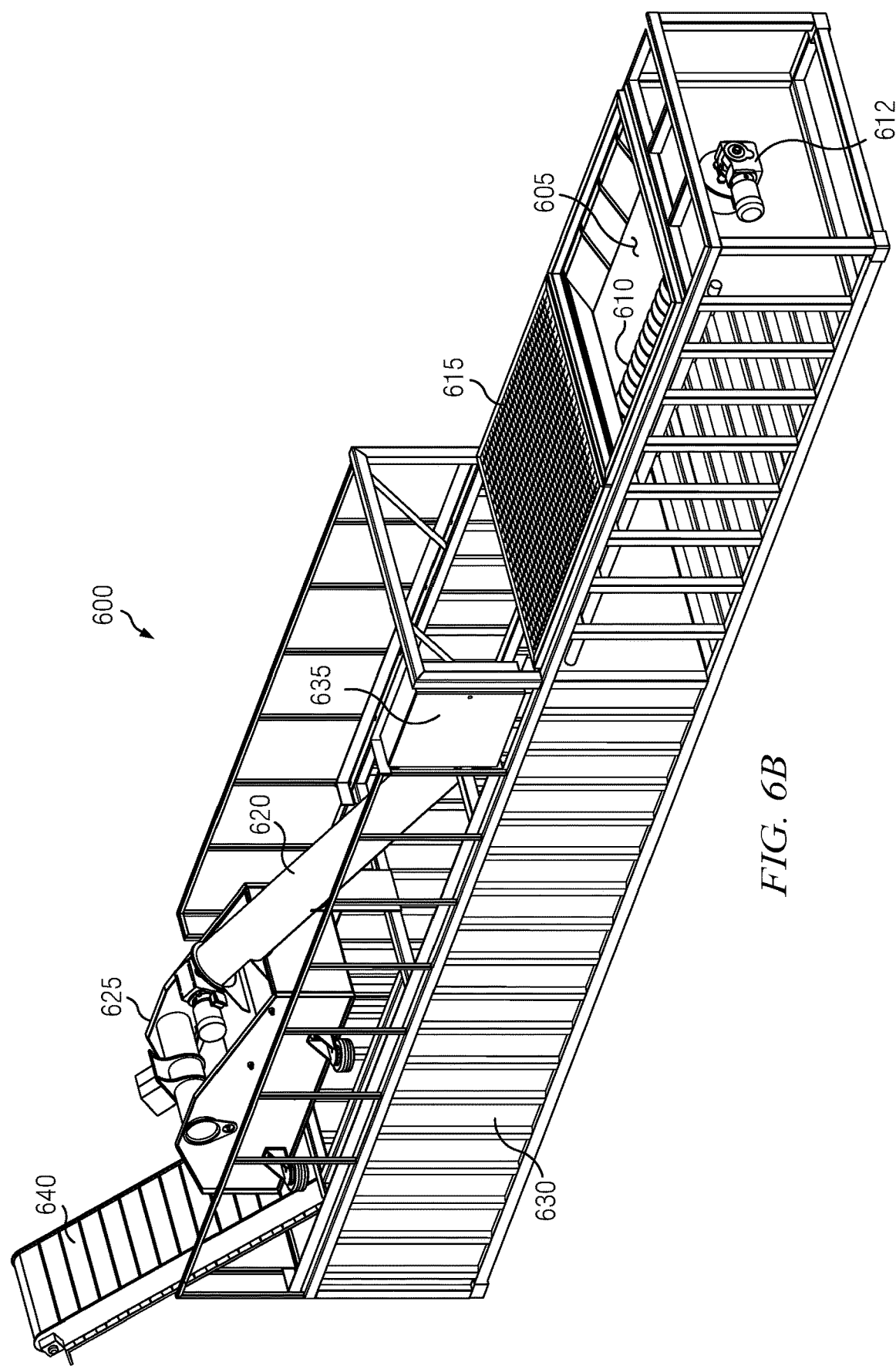
FIG. 6B depicts a general arrangement of the embodiment of preliminary processing and feed system 600 shown on FIG. 6A.
Figure 6C:
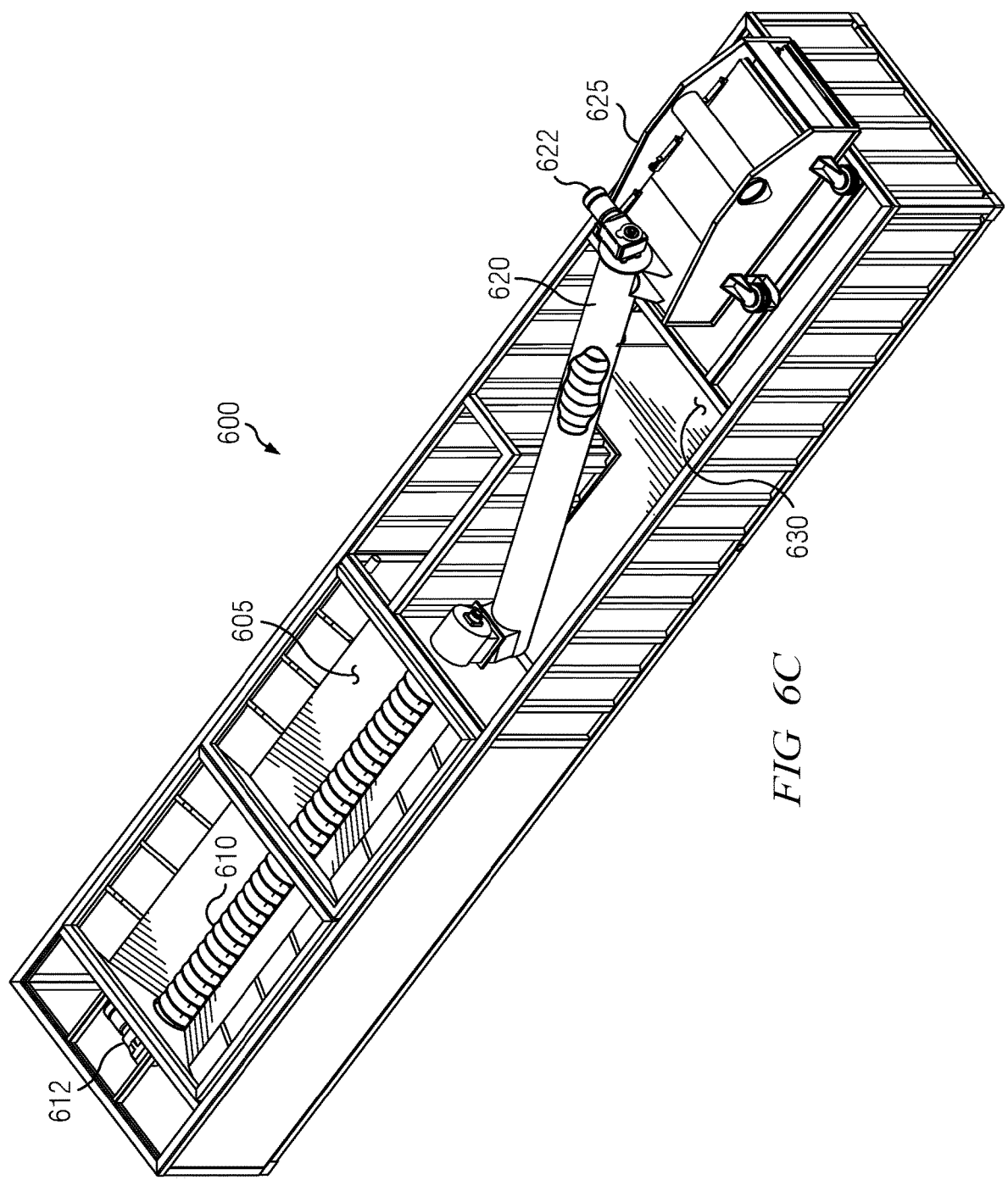
FIG. 6C is similar to FIG. 6B, except depicting preliminary processing and feed system 600 from above.

FIGS. 6A through 6C illustrate one embodiment of an optional preliminary processing and feed system 600 for the PLRS described above. FIGS. 6A through 6C should be viewed together. Where the same part or feature is called out on any of FIGS. 6A through 6C, the part or feature has the same reference numeral on others of FIGS. 6A through 6C.

FIG. 6A illustrates a currently preferred embodiment of optional preliminary processing and feed system 600 in position to receive raw, untreated liquid through grating 615. Preliminary processing and feed system 600 then pretreats the liquid before feeding the pretreated liquid to a PLRS consistent with the embodiment of FIGS. 3A and 3B. In the embodiments depicted on FIG. 6A, a vehicle gravity-drops raw, untreated liquid through grating 615 into an input tank below (input tank hidden from view on FIG. 6A). First auger (also hidden from view on FIG. 6A, but shown on FIGS. 6B and 6C) and second auger 620 then cooperate to generate a continuous flow of raw, untreated fluid onto shaker 625 for preliminary solids removal. Solids removed by shaker 625 are carried away by conveyor 640 for further disposal, while pretreated liquid falls through shaker 625 into a liquid holding tank under shaker 625 (holding tank hidden from view on FIG. 6A).

It will be appreciated on FIG. 6A that vehicles carrying raw, untreated liquid (vacuum tracks and trailers, for example) may simply pull up d then pull away, dropping off raw liquid through grating 615 and into the input tank below. Likewise, dump trucks may easily load up and haul away solids removed by shaker 625 and carried away by conveyor 640.

With further reference to FIG. 6A, pretreated liquid resident in the liquid holding tank under shaker 625 is then delivered to the PLRS via feed line 701. Conventional pump 703 and gate valve 702 controls delivery to the PLRS. As shown on FIG. 6A, and with cross reference to FIG. 3B and associated disclosure, pretreated liquid enters the PLRS at first shaker 301, the PLRS's designated entry point for liquid to be treated. It will appreciated that delivery of pretreated liquid to shaker 301 by feed line 701 is illustrated functionally on FIG. 6A. In practice, such delivery may also include initial flow through intervening structure such as drop tanks, supplemental pumps, manifolds or stand pipes, for example. Such intervening structure is omitted on FIG. 6A, so that delivery of pretreated liquid by feed line 701 to shaker 301 on the PLRS may be shown clearly.

FIG. 6B depicts a general arrangement of preliminary processing and feed system 600. It will be appreciated that the components illustrated on FIG. 6B may be packed into a specifically-designed container with a standard cargo container footprint for convenient transport. Although specially designed, the container may be transported with conventional trucks, rail cars or other cargo container transport.

FIG. 6B illustrates components described above with reference to FIG. 6A in more detail. FIG. 6B shows grating 615 disposed above input tank 605. Grating 615 on FIG. 6B is partially removed to depict first auger 610 located near the bottom of input tank 605. In the embodiment illustrated in FIG. 6B, input tank 605 preferably has a V-shaped profile to gravity-assist raw, untreated liquid onto first auger 610 near the bottom of input tank 605. FIG. 6B also depicts sloped second auger 620, shaker 625, pretreated liquid holding tank 630 beneath shaker 625, and optional conveyor 640 for carrying solids off shaker 625.

FIG. 6C is similar to FIG. 6B, except depicting preliminary processing and feed system 600 from above. FIG. 6C further illustrates components described above with reference to FIGS. 6A and 6B. Grating 615, shown on FIGS. 6A and 6B, is completely removed on FIG. 6C to reveal first auger 610 located near the bottom of input tank 605. In the embodiment illustrated in FIG. 6C, input tank 605 preferably has a V-shaped profile to gravity-assist raw, untreated liquid onto first auger 610 near the bottom of input tank 605. It will be seen on FIG. 6C that first auger 610 is open substantially all the way along input tank 605 to allow as much throughput as possible. FIG. 6C further illustrates a gravity transfer from first auger 610 to second auger 620. Second auger 620 then carries and elevates raw, untreated liquid for delivery to shaker 625. By contrast to first auger 610, second auger 620 is closed except for openings to receive raw liquid from first auger 610, and to deliver raw liquid to shaker 625. Second auger 620 is closed to enable elevated delivery of raw liquid from first auger 610 to shaker 625 with minimal loss or spillage, particularly avoiding contamination of liquid already processed by shaker 625 in pretreated liquid holding tank 630 below.

Electrical panel 635 is also shown on FIG. 6B. It will be appreciated that preferably all of the components in preliminary processing and feed system 600 are electrically powered, either by generator, or by suitable utility supply if available. Electrical power is particularly preferred for portable embodiments of preliminary processing and feed system 600. FIG. 6B shows first auger 610 powered by first electric auger motor 612, and FIG. 6C shows second auger 620 powered by second electric auger motor 622.

In currently preferred embodiments, preliminary processing and feed system 600 as illustrated on FIGS. 6A through 6C has an overall processing goal of 6,000 to 10,000 gallons per hour throughput. Currently preferred embodiments include an 8" pitch auger for first auger 610, an 8"-10" progressive pitch auger for second auger 620, and a 6-screen shaker 625 providing 7,500 sq. in. total screen surface. These specifications are exemplary, however, and this disclosure is not limited in this regard. The optional conveyor 640 is conventional and commercially available. Current embodiments prefer a progressive pitch in second auger 620 to encourage smooth liquid flow up its incline. The smaller pitch is deployed near input tank 605 and the larger pitch near shaker 625. The larger pitch provides increased volume inside second auger 620 near shaker 625, and thus discourages blocking or choking as a result of gravity-induced compaction.

It was noted above that currently preferred embodiments of the PLRS are continuous, obviating the need for batch processing of additive. Current embodiments of the PLRS have a target overall continuous throughput of 50-100 gallons per minute, depending on the application. It will be appreciated that the flow rates and throughputs of the various components on the PLRS may be controlled and optimized independently to generate a continuous overall PLRS throughput. To that end, holding tanks are provided on the PLRS throughout to assist control and metering of liquid flow from one component to the next.

It will be understood that the disclosed PLRS has been described above with respect to drilling fluid ("mud") and sewage treatment applications. It will be further understood that these applications have been used in this disclosure primarily for illustration purposes, and that the scope of the PLRS technology is not limited to these applications. Other applications currently envisaged include, for example and without limitation, treatment and cleaning of fracturing ("fracking") fluid, water discharge from oil wells, water extracted from dewatering applications, brackish well water and agricultural waste. Additional applications currently envisaged include vacuum tank effluent disposal, such as encountered in pothole operations during horizontal directional drilling.

It will be further appreciated that the scope of the disclosed externally-actuated rack and pinion mud screen locks is not limited to the embodiments described above on shakers on the disclosed PLRS. The scope extends to deployments on shakers used in many other solids control applications.

It will be further appreciated that the scope of the disclosed preliminary processing and feed system is not limited to the embodiments described above in which the unit is used in conjunction with the disclosed PLRS. The scope extends to independent use of the unit, or use of the unit in conjunction with other equipment in many other solids control applications.

Further, while the scope of this disclosure is not limited to the type of industrial waste that may be handled by the preliminary processing and feed system, currently envisioned applications include processing: (1) potholing waste with high solids content from horizontal directional drilling, (2) subterranean drilling fluid with high solids content, and (3) animal waste. These envisioned applications are examples only.

It will be also appreciated that the disclosed preliminary processing and feed system is scalable, and may be designed up or down in scale for different applications with correspondingly different goals for throughput processing rates.

Although the inventive material in this disclosure has been described in detail along with some of its technical advantages, it will be understood that various changes, substitutions and alternations may be made to the detailed embodiments without departing from the broader spirit and scope of such inventive material as set forth in the following claims.

I claim:

1. A method for removing solids from an untreated liquid, the method comprising the steps of:
    (a) passing the untreated liquid through at least one treatment shaker to yield a first treated liquid;
    (b) passing the first treated liquid through at least one hydrocyclone to yield a second treated liquid;
    (c) adding a particle-removing additive to the second treated liquid to yield a third treated liquid, wherein the particle-removing additive is pre-mixed with a precursor liquid in a mixing tank prior to addition to the second treated liquid, wherein the mixing tank further includes:
    at least two neighboring chambers, each chamber having a chamber top and a chamber bottom, each chamber further having at least one impeller, wherein rotation of each impeller encourages flow within the corresponding chamber from the chamber top to the chamber bottom;
    wherein fluid flow between at least two neighboring chambers is separated by a baffle assembly, the baffle assembly including first, second and third baffles in order of fluid flow between chambers;
    wherein the first baffle is open at the chamber bottom and closed off at the chamber top;
    wherein the second baffle is closed at the chamber bottom and open at the chamber top; and
    wherein the third baffle is open at the chamber bottom and closed at the chamber top; and
    (d) passing the third treated liquid through at least one centrifuge to yield a fourth treated liquid.

2. The method of claim 1, in which the second baffle has a top edge proximate the chamber top, the second baffle further including serrations on the top edge.

3. The method of claim 1, in which the second baffle has a bottom edge proximate the chamber bottom, the second baffle further including a cleaning door on the bottom edge such that the cleaning door when open permits fluid flow between neighboring chambers, the cleaning door further including a door handle for opening and closing the cleaning door, wherein the door handle is actuated from outside the chambers.

* * * * *